US007921419B2

(12) United States Patent
Chatterjee et al.

(10) Patent No.: US 7,921,419 B2
(45) Date of Patent: Apr. 5, 2011

(54) METHOD AND MECHANISM FOR MANAGING INCOMPATIBLE CHANGES IN A DISTRIBUTED SYSTEM

(75) Inventors: Surojit Chatterjee, Foster City, CA (US); Sameer Joshi, San Jose, CA (US); Alok Kumar Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1210 days.

(21) Appl. No.: 10/844,875

(22) Filed: May 12, 2004

(65) Prior Publication Data

US 2005/0257211 A1 Nov. 17, 2005

(51) Int. Cl.
*G06F 9/44* (2006.01)
(52) U.S. Cl. ......... 717/170; 717/122; 717/169; 707/695
(58) Field of Classification Search ........... 717/168–170
See application file for complete search history.

(56) References Cited

U.S. PATENT DOCUMENTS

| | | | |
|---|---|---|---|
| 4,817,091 A | 3/1989 | Katzman et al. | |
| 5,551,027 A | 8/1996 | Choy et al. | |
| 5,832,484 A | 11/1998 | Sankaran et al. | |
| 6,016,499 A | 1/2000 | Ferguson | |
| 6,067,584 A | 5/2000 | Hayles et al. | |
| 6,185,734 B1 * | 2/2001 | Saboff et al. | 717/164 |
| 6,327,594 B1 | 12/2001 | Van Huben et al. | |
| 6,345,382 B1 | 2/2002 | Hughes | |
| 6,446,092 B1 | 9/2002 | Sutter | |
| 6,584,476 B1 * | 6/2003 | Chatterjee et al. | 707/203 |
| 6,697,795 B2 * | 2/2004 | Holcomb | 707/2 |
| 6,711,571 B2 * | 3/2004 | Putzolu | 707/9 |
| 6,966,058 B2 * | 11/2005 | Earl et al. | 717/171 |
| 7,003,677 B1 | 2/2006 | Herzberg et al. | |
| 7,117,495 B2 * | 10/2006 | Blaser et al. | 717/174 |
| 7,260,818 B1 * | 8/2007 | Iterum et al. | 717/170 |
| 7,305,669 B2 * | 12/2007 | Roush | 717/170 |
| 7,318,070 B2 * | 1/2008 | McGee et al. | 707/104.1 |
| 7,451,434 B1 * | 11/2008 | Blumenthal et al. | 717/116 |
| 2001/0005848 A1 | 6/2001 | Haverstock et al. | |
| 2001/0056461 A1 | 12/2001 | Kampe et al. | |
| 2002/0143764 A1 * | 10/2002 | Martin et al. | 707/8 |
| 2002/0156875 A1 | 10/2002 | Pabla | |
| 2003/0046430 A1 | 3/2003 | Iwade et al. | |
| 2003/0097637 A1 | 5/2003 | Tozawa et al. | |
| 2003/0135755 A1 | 7/2003 | Hahn | |
| 2003/0191739 A1 | 10/2003 | Chatterjee et al. | |
| 2004/0210582 A1 | 10/2004 | Chatterjee et al. | |
| 2005/0160419 A1 * | 7/2005 | Alam et al. | 717/174 |
| 2005/0257211 A1 | 11/2005 | Chatterjee et al. | |

(Continued)

OTHER PUBLICATIONS

Devarakonda, Murthy et al., "Recovery in the Calypso File System," ACM Transactions on Computer Systems, vol. 14, N9. 3, Aug. 1996, pp. 287-310.

(Continued)

*Primary Examiner* — Lewis A Bullock, Jr.
*Assistant Examiner* — Jue Wang
(74) *Attorney, Agent, or Firm* — Vista IP Law Group, LLP.

(57) ABSTRACT

A method and mechanism for managing data to resolve incompatibilities between different versions of data is disclosed. According to one approach, incompatibilities to private data is managed using group/member dependent key(s)/link(s), static shared data is managed using group/member dependent key(s)/link(s), and dynamic shared data is managed using data transformation function(s).

50 Claims, 17 Drawing Sheets

U.S. PATENT DOCUMENTS

2006/0031532 A1     2/2006   Sanders

OTHER PUBLICATIONS

Ganger, Gregory R. et al., "Embedded Inodes and Explicit Grouping: Exploiting Disk Bandwidth for Small Files," First appeared in the Proceedings of the USENIX Technical Conference, Jan. 1997, pp. 1-17.
Gray, Jim et al., "Transaction Processing: Concepts and Techniques," 1993, pp. 556-558.
McKusick, Marshall Kirk et al., "A Fast File System for UNIX*," Revised Feb. 18, 1984, pp. 1-14.
Pfister, Gregory F., "Second Edition, In Search of Clusters, The Ongoing Battle in Lowly Parallel Computing," 1995, Chapter 4, pp. 71-84.
Read, Tim et al., "Robust Clustering: A Comparison of Sun™ Cluster 3.0 versus Sun Cluster 2.2 Software," Sun BluePrints™ OnLine—Sep. 2001, pp. 1-23.
Rosenblum, Mendel et al., "The Design and Implementation of a Log-Structured File System," Jul. 24, 1991, pp. 1-15.
Smith, Keith et al., "File Layout and File System Performance," TR-35-94, undated, pp. 1-23.
Vogels, Werner et al., "The Design and Architecture of the Microsoft Cluster Service, A Practical Approach to High-Availability and Scalability," May 1997, Cornell University Dept. of CS Technical Report, number assignment in preparation, 10 pages.
Vogels, Werner et al., "Scalability of the Microsoft Cluster Service," undated, 9 pages.
Ylonen, Tatu, "Shadow Paging is Feasible," undated, pp. 1-15.
Ylonen, Tatu, "Write Optimizations and Clustering in Concurrent Shadow Paging," undated, pp. 1-16.
Ylonen, Tatu, "Concurrent Shadow Paging: A New Direction for Database Research," undated, pp. 1-7.
Compaq Computer Corporation, UNIX Software Division, "Cluster File System in Compaq *TruCluster* Server, Extending the advantages of single-system file systems to high availability clusters," Sep. 2001, pp. 1-13.
Hewlett-Packard Company, "The Gold Standard: Cluster File System in hp *TruCluster* Server, Extending the advantages of single-system file systems to high availability clusters," Oct. 2002, pp. 1-16.
Microsoft Corporation, "Microsoft © Windows2000 Advanced Server, Windows 200 Clustering Technologies: Cluster Service Architecture," 2000, 27 pages.
Oracle Corporation, "Oracle 8*i*, Administrator's Guide," Release 2 (8.1.6), Dec. 1999, Part No. A76956-01, Chapter 16, 14 pages.
Sun® Microsystems, Inc., "The Sun Enterprise Cluster Architecture, Technical White Paper," 1997, pp. 1-74.
Office Action dated Jun. 12, 2008 for U.S. Appl. No. 10/845,016.
Office Action dated Jun. 29, 2007 for U.S. Appl. No. 10/845,016.
Office Action dated Dec. 13, 2006 for U.S. Appl. No. 10/845,016.
Office Action dated Dec. 12, 2007 for U.S. Appl. No. 10/845,016.
Non-Final Action dated May 25, 2010 for U.S. Appl. No. 10/845,016.
Final Office Action dated Jul. 21, 2009 for U.S. Appl. No. 10/845,016.

* cited by examiner

METHOD AND MECHANISM FOR MANAGING INCOMPATIBLE CHANGES IN A DISTRIBUTED SYSTEM

BACKGROUND AND SUMMARY

The invention relates to a method and mechanism for managing data when upgrading software in a distributed computing system.

Over time, many types of software applications will undergo some sort of change. These changes may occur for a variety of reasons. For example, given the complexity of modern software applications, it is well known that most software contains coding errors or "bugs" that will need correction. One reason to upgrade from an earlier version to a later version of a software application is to correct errors or bugs that may exist in the earlier version. Another reason for changing a software application is to introduce improvements to the operation or functionality of the software application. Yet another reason is to change a software application is to meet new requirements or to adapt to changes in its environment, e.g., new hardware.

A "rolling upgrade" refers to the process of performing software upgrades to a live existing software installation in a distributed environment in which the instances, nodes, or entities of the distributed system (referred to herein as "members") are upgraded in a staggered manner. This form of upgrade ensures availability of the application during software upgrades, and thus minimizes or eliminates planned downtime while contributing to high availability goals. As used herein, the term member may encompass either a single instance/node/entity or a collection of such instances/nodes/entities. One example approach for performing a rolling upgrade is described in co-pending U.S. application Ser. No. 10/803,623, entitled "METHOD AND MECHANISM FOR PERFORMING A ROLLING UPGRADE OF COMPUTER SOFTWARE", filed on Mar. 17, 2004, which is hereby incorporated by reference in its entirety.

At each member, there are numerous ways to upgrade a software application from an earlier version to a later version. A common approach is for a software developer to create patches and patch sets that are applied to a copy of the software binary or executable. Another common approach is to create a new object having the same location reference. Tools are often provided to perform the software upgrades or installations.

Performing an upgrade or change to an existing software application typically requires a shutdown of either/both the member or software enterprise. For example the upgrade can be performed by shutting down the software, implementing the upgrade, and then bringing the member back up so that availability is restored.

With modern software, it can be anticipated that software developers will provide upgrades and changes on an ongoing basis. In fact, many IT ("information technology") departments will periodically schedule planned events to perform upgrades to their software installations. These events could result in significant planned downtimes. It is desirable to limit the effects of these downtimes as much as possible since they could affect the availability of mission critical systems, potentially resulting in productivity and financial losses for organizations.

When a software application is upgraded to a new version, it is possible that data associated with, operated upon, or dependent from the new software versions will also change. This could include changes to the content, format, or organizational structures of the data. For example, when a database application changes from an old version to a new version, it is quite likely that configuration metadata for the database system or the data content will be different between the two versions of the software. In many cases, the data for the old version of the software is different enough from the data for the new version of the software such that they are incompatible between the different versions of the software.

Many distributed systems operate with data that is shared between multiple members. Both data content and data metadata may be shared by members in a distributed system. For example, a distributed order processing system is a database system in which multiple members access and operate upon a shared central ordering database. Regardless of the version/type of software being used, the members in this type of system would access the shared database.

If members in the distributed system operate upon shared data, then concurrently running different versions of the same software in a distributed system could present a problem if expected data for the different versions of the software are incompatible. The problem occurs when a rolling upgrade is being performed and different members within the distributed system are concurrently operating different versions of a software application that only work with different versions of the shared data. Thus, a first member running a first version of a software may expect a particular data element to be in a first storage configuration or in a first data format. A second member running a second version of the software may expect that same data element to be in another storage configuration and/or in another data format. If these two storage configurations or data formats are incompatible with each other, then since the data element is being shared between the two members, this causes an incompatibility that can interfere with the functioning of the software application during the rolling upgrade.

Embodiments of the present invention provides a method and mechanism for managing data to resolve incompatibilities between different versions of data during an upgrade. The technique works for both shared and non-shared data. In addition, the present approach is tolerant of changes that occur over time and over many different versions, and thus can be useful over an indefinite time period. According to one embodiment of the invention, incompatibilities to member private data in a global namespace is managed using group/member dependent keys, static shared data is managed using group/member dependent keys/links, and dynamic shared data is managed using data transformation functions. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

Figure 1A:
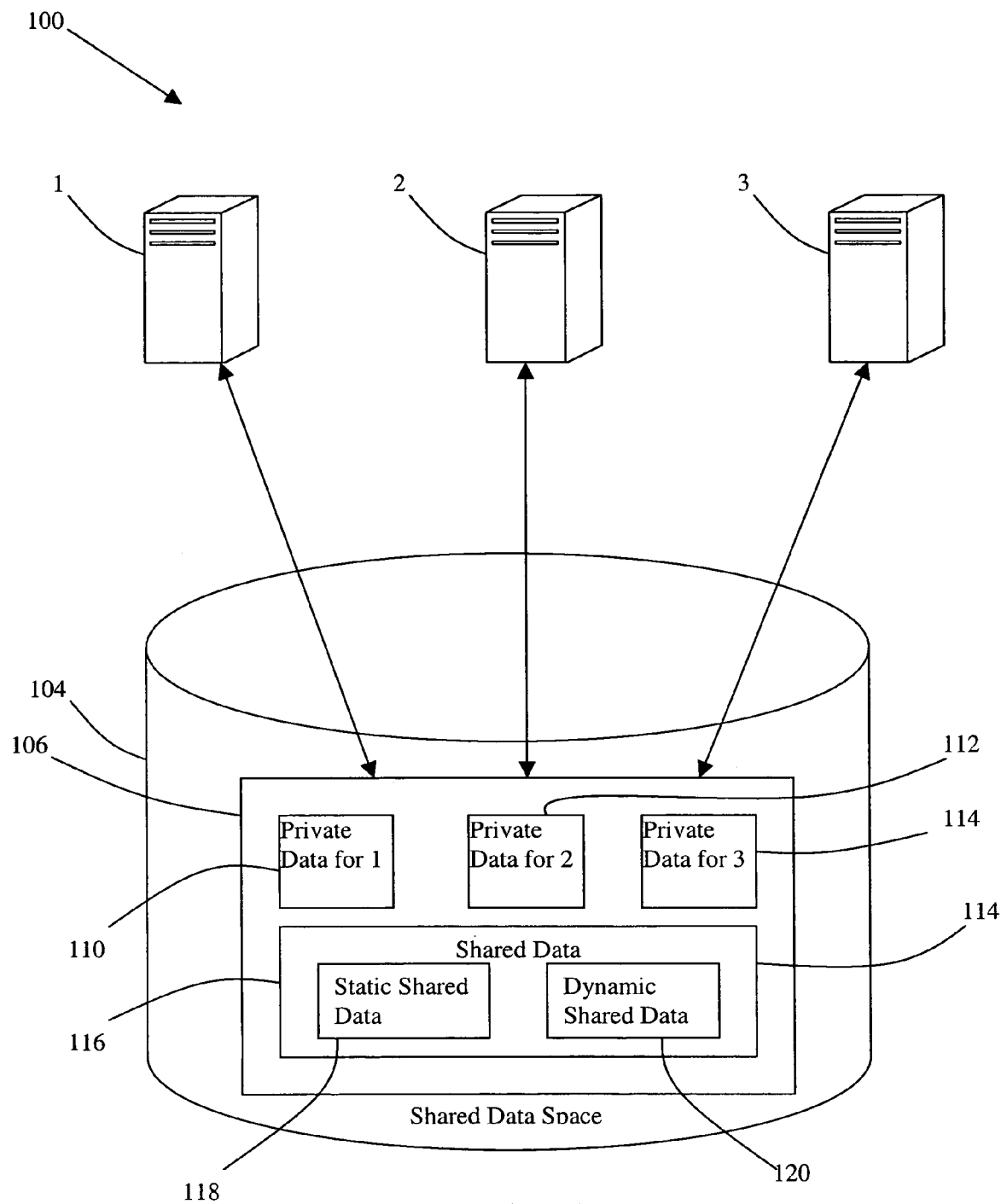
FIG. 1A shows an example of a system in which multiple members access data.

Embodiments of the present invention provide a method and mechanism for managing data to resolve incompatibilities between different versions of data. This is a circumstance that could occur, for example, during a rolling upgrade to a distributed system. While the particular embodiments described herein are illustrated with respect to a rolling upgrade operation, it is noted that the invention is not to be limited to this particular operation, and may be employed in numerous other applications to manage data.

Description of Example Data Structures

Before describing the present embodiment(s) of the invention, a brief description will be provided of example types of data models, structures, and key descriptions in modern computing systems. These types of data models, structures, and key descriptions will be used in this document to illustrate embodiments of the invention. It is noted, however, that the specific data models, structures, and descriptions illustrated herein are not limiting to the scope of the invention, and indeed, it will be clear that the invention can be used with many other types of data models, structures, and key arrangements.

A data model provides the general structure of a set of data, e.g., a database. A data model can be viewed as a collection of conceptual tools for describing data, data relationships, data semantics, and consistency constraints. It is often useful to model data in a hierarchical structure. In a hierarchical model, data and relationships among data are represented by records and links, respectively. Hierarchically modeled data is logically structured as a "tree", which includes a conglomeration of parent-child relationships between data within the hierarchical structure. LDAP (Lightweight Directory Access Protocol), Microsoft® Windows® registry, and Oracle® Cluster Registry are examples of uses of hierarchically modeled or structured information.

Structuring data hierarchically provides some benefits over other data structures. It is easier to explore hierarchically structured data than other data structures, due to the inherent semantic benefits of the hierarchical structure. For example, one can intuitively traverse a hierarchy to locate a specific data item of interest.

Hierarchically organized data is often represented by a key name-value (or name-value) pair. More specifically, each item of information is identified within the hierarchy by a key name consisting of key components. The term "key name" is generally used herein to refer to a specific value within the key domain associated with the hierarchy. For example, a key domain may be network IP addresses and an associated key name may be 255.255.000.000. For another example, a domain may be the collection of URLs associated with the public Internet, and an associated key of the domain may be a specific URL associated with a specific web page.

For example, a file's location in a hierarchical directory may be identified as: C:\My Documents\example.doc, wherein each backslash separates levels of the associated hierarchy. More generally, information may be identified by a key name represented as a character string, such as a.b.d.e, where key component e is a child (i.e., a descendant) of key component d, key component d is a child of key component b, and so on, to the hierarchy root. In some contexts, hierarchically organized information contains name-value pairs. A value is information associated with a name. For example, in the foregoing hierarchical directory path, "My Documents\example.doc" is a name of a name-value pair. The content of this file is the value of the name-value pair.

While the present description is illustrated using terminology relating to "keys" as a particular example of an index type that may be used in conjunction with the present invention, it is noted that the present invention may be used with other index types and data access structures, and thus is not limited in its application to keys. Thus, the term "key" as used herein also encompasses other kinds of index types and data access structures/identifiers. Both the term "key name" and/or "key description" may be used herein to generally refer to any mechanism for implementing a key identifier or data identifier (or any other suitable index structure).

A distributed system may include multiple logical computational units. Each logical computational unit may be referred to as a "member" of the distributed system. Thus, a member may be a network-connected personal computer, workstation, central processing unit (CPU), a type of computing node, or other logical computational unit such as an instance of a program. Members of a distributed system can communicate with each other.

A "group" includes a subset of members within a distributed system. A group can have a minimum of one member and a maximum of all members in a distributed system. In an embodiment, a group may be created or modified to have zero present members.

Multiple members of a distributed system may share a common entity. One such shared entity is a shared storage device or file system. All of the members in the distributed system may directly access the shared storage device or file system (e.g., through a network). All of the members in the distributed system can see a given file within the shared storage device or file system. All of the members within the distributed system may access the contents of the given file. In other words, the data that is contained in the file is "public" or "global" to all members and not "private" to any particular member.

It is common for one member of a distributed system to be one instance of a particular computer program, and for another member of the distributed system to be another instance of the same computer program. Each member of a distributed system may be a different instance of the computer program. Each instance may be able to communicate with each other instance. The particular computer program may be, for example, a database server. The particular computer program may execute, for example, in the form of multiple concurrent processes.

All instances of the particular computer program may attempt to read or write to the same particular location and/or file (such as a configuration file) in the shared file system. The particular computer program might not have been designed to operate on a shared file system. Therefore, by overwriting a value in the particular file, one instance of the particular program may cause the other instance of the computer program to subsequently read an incorrect value. Such data conflicts constitute a problem.

This problem particularly impacts registries. A registry is a data repository that stores configuration information. A single registry may store configuration information for multiple databases that are stored on a single shared storage subsystem. A registry may organize data according to the hierarchical data model described above. Configuration information for multiple databases may be hierarchically organized beneath a single root.

One example of a multi-instance database server is the RAC product (Real Application Clusters), which is available from Oracle Corporation of Redwood Shores, Calif. This type of product can have multiple instances of the same program running as multiple members of a distributed system. To communicate with each other, each of these instances uses specific ports. For example, a key like "RAC.instancename" could be created in a shared (between all the instances of RAC) configuration repository such as a registry. Each instance of RAC stores its name as a value of the key "RAC.instancename". Consequently, every time, after the first time, that an instance of RAC stores its name as a value of this key, the previous value of this key will be overwritten. This results in a data conflict.

Many applications require that the multiple members of a distributed system (such as instances of the same computer program) refer to a piece of data in the global repository by the same name but read or write a value that is specific for each instance.

Description of Embodiment(s)

Embodiments of the present invention provide an improved method, mechanism, and article of manufacture for addressing and maintaining shared data that may be incompatible between different versions during or after an upgrade. The technique works if multiple members are operating against different versions in a global namespace in a distributed environment or even if the members are accessing data for different versions in a global namespace within a single storage device. In addition, the present approach is tolerant of changes that occur over time and over many different versions, and thus can be useful over an indefinite time period. It is noted that the present description is made in the context of a rolling upgrade; however, the present invention may be used to manage incompatible changes for other and additional contexts, and thus is not to be limited to just its application to rolling upgrades (e.g., the invention can also be applied during rolling downgrades).

FIG. 1A shows an example of a distributed computing system 100 having multiple members 1, 2, and 3 that access a set of data 106. The data 106 may be located on a single disk 104 or spread out across multiple disks that are accessible to the members 1, 2, and 3.

Within the data 106 accessible by the members of the distributed system, there may be different types of categorizations of the data based upon configuration or usage attributes for the data. Some example categories of data are shown in FIG. 1A. A first example category of data is the member private data 110, 112, 114. Member private data includes data within a global namespace that is only associated or accessible by a designated group of one or more members. A second example category of data is the shared data 116. Shared data 116 may be accessed by multiple different members or groups of members. Subcategories of shared data 116 include static shared data 118 and dynamic shared data 120.

An example type of member private data is data in which the same key is used to reference data accessed by the different member, but the returned value of that key may not be the same. An example of this type of data is the port number accessed by a software application on a member. The port number may be accessed using the same key identifier on each member, but the actual port number (and therefore the key value) may differ from member to member.

Static shared data 118 corresponds to shared data that is accessed by multiple different members or groups of members using the same key, but in which it is contemplated that the data will either never change or will change only under sparse circumstances. Therefore, it is likely that once this type of data is set to a particular value, it will not normally change to another value. An example of this type of data is application or system metadata, e.g., node identification numbers.

Dynamic shared data 120 corresponds to a type of shared data in which it is contemplated that the data may possibly change on a more frequent or regular basis. An example of this type of data is program state data for a running application that is constantly being updated and persisted to disk.

Incompatibilities in the data may be introduced during operations that affect the data, such as a rolling upgrade (or downgrade) operation. According to an embodiment of the invention, if the data to be accessed by different versions of a software application are incompatible between the different application versions, then multiple distinct sets of the shared data are maintained in the system that are appropriate for the different versions of the application software. The multiple versions are maintained such that seamless access is provided to the correct version of the shared data for each member in the distributed system.

In one embodiment, the type or character of the data is taken into consideration when determining the mechanism for maintaining the different versions of the data, e.g., when performing a rolling upgrade. Thus, for example, a different approach can be taken to address changes for private data than the approach for managing different versions of static or dynamic shared data.

Figure 1B:
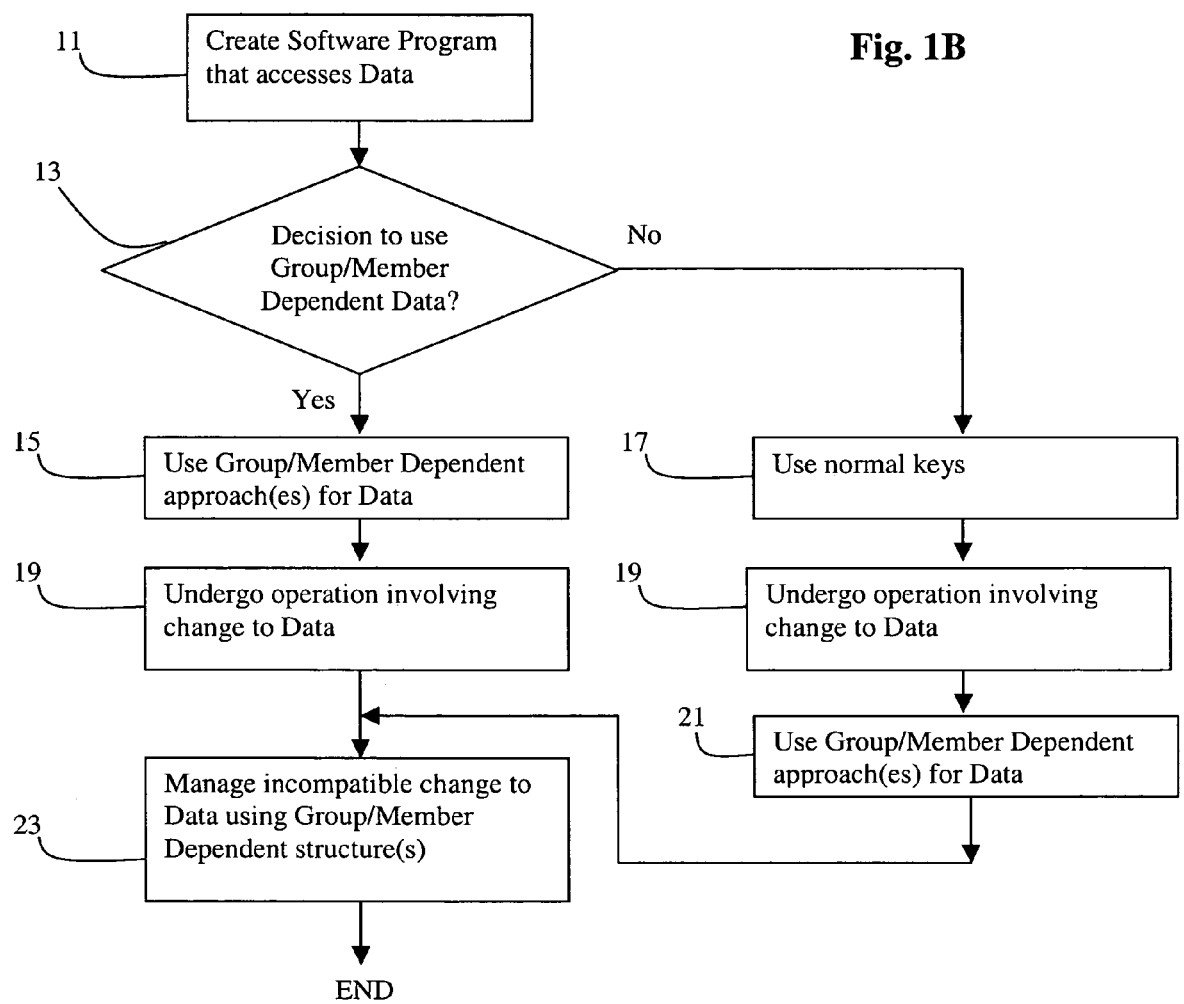
FIGS. 1B-C show flowcharts of a process for managing data according to an embodiment of the invention.

FIG. 1B is a flowchart of a process for creating and managing data according to an embodiment of the invention. At 11, a software application is created by a developer. The software application is designed to use, access, and/or modify data during the course of its operation, in which some or all of the data encompasses private data, static shared data, and/or dynamic shared data. At 13, a decision is made whether to use normal keys to implement the data (17) or to use group/member dependent approaches to implement the data (15). Examples of group/member dependent approaches to implement the data include using group/member dependent keys and group/member dependent links, as described in more detail below.

One reason to use group/member dependent approaches is if the developer realizes upfront that a later rolling upgrade may introduce incompatibilities in the data if normal keys are used. If this is true, then for example, the developer can use group dependent keys or member dependent keys to implement the data at 15. In one embodiment, it is preferred to use group/member dependent keys instead of group/member dependent links upon such an upfront recognition of possible future changes to the data, since the group/member dependent keys may be more efficient to employ at this stage of the process.

If a later operation involving a change to the data occurs (19), e.g., a rolling upgrade, then the incompatible changes can be directly managed using the group/member dependent structures to ensure that only members or groups associated with particular versions of the data can access that data, which prevents other members from accessing what is to them incompatible data (23).

If the software application was originally developed using normal keys (17), and thereafter undergoes an operation that introduces incompatibilities in the data (19), such as a rolling upgrade operation, then a modification is made to use group/member dependent approaches to implement the data (21). This type of action may be taken by the software developer when releasing the new version of the software, in which the structure of the data associated with the application is directly changed with the software upgrade to implement group/member dependent structures. Alternatively, an external mechanism may be employed to specifically target and modify the implementation of the data to use group/member dependent structures.

Figure 1C:
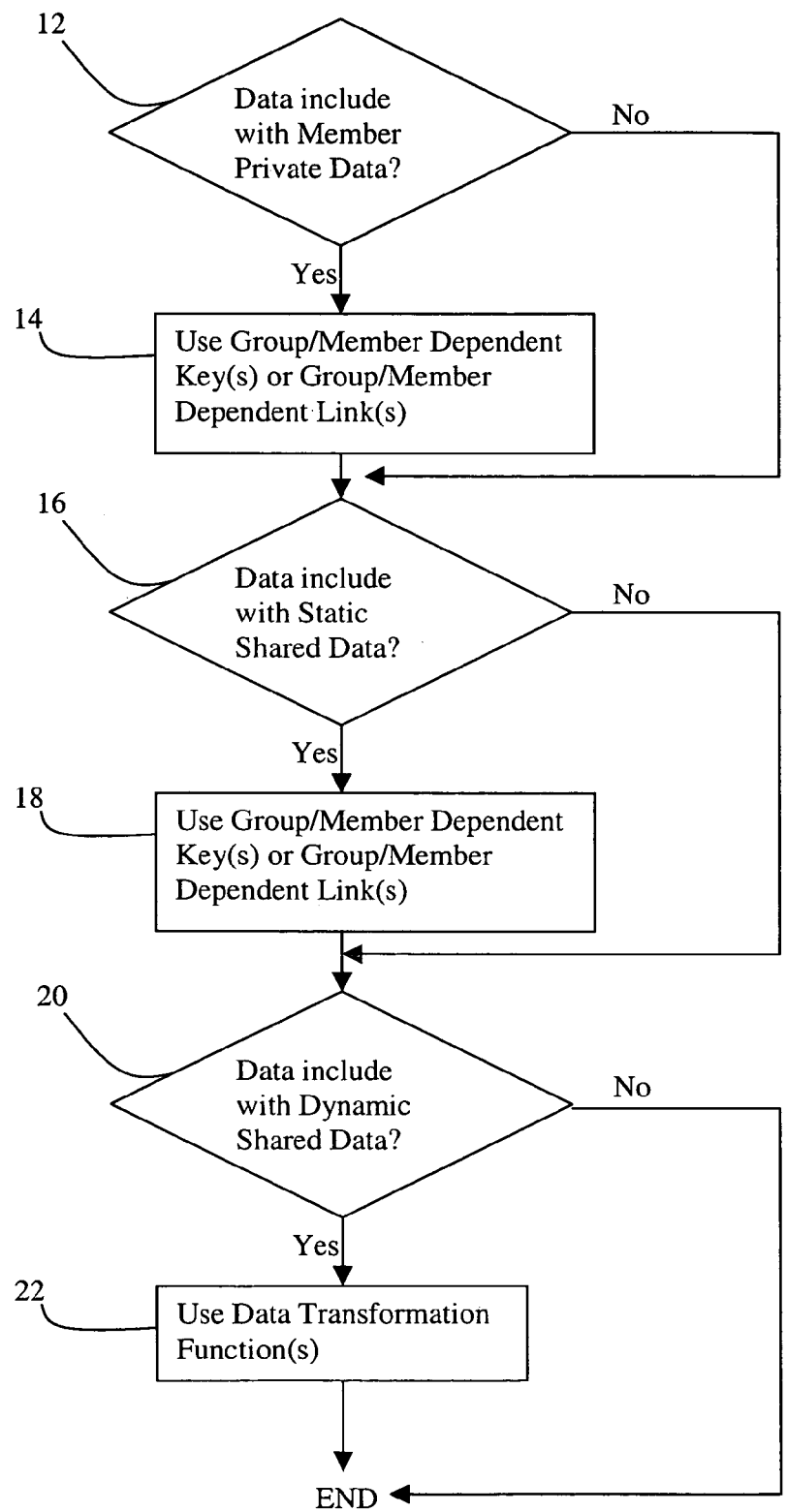

FIG. 1C shows a flowchart of a process for using group/member dependent approaches to implement data according to an embodiment of the invention, which generally can be used to address action 21 of FIG. 1B. A determination is made whether the affected data includes member private data (12). If so, then the member private data is managed using group dependent keys (GDKs) or member dependent keys (MDKs) (14). A GDK allows a group of members to create and use private data using a global namespace. According to one embodiment, a GDK is visible to all members of a distributed system, but its value(s) and subtree(s) could be different for different groups. An MDK can be implemented as a GDK in which the group associated with the GDK includes only a single member. Alternatively, group/member dependent links may be used to manage the private data.

A determination is also made whether the affected data includes static shared data (16). If so, then the static shared data is managed using group dependent links (GDLs) (18). A GDL is a link between keys that is only visible for the members of the group for which it is created. If a key is a source of a GDL for a first group, then when that key is referenced by members of that group it will actually read the destination of the GDL. It is noted that a GDL becomes a member dependent link (MDL) if the group associated with the GDL contains only a single member. The static shared data may also be implemented as group/member dependent keys, particularly if done during the initial software development process if the developer had recognized upfront that incompatibilities may be introduced during a later rolling upgrade.

A determination is made whether the affected data includes dynamic shared data (20). If so, then the dynamic shared data is managed using one or more data transformation functions (22). A data transformation function (DTF) is functionality that transforms the structure or format of one version of a data item into the expected data structure of another version of the data item, and vice versa.

Approaches for implementing an group dependent keys, member dependent keys, group dependent links, member dependent links, and data transformation functions are disclosed in co-pending U.S. application Ser. No. 10/304,449, filed on Nov. 25, 2002, and in co-pending U.S. application Ser. No. 10/845,016, entitled METHOD AND MECHANISM FOR MANAGING AND ACCESSING STATIC AND DYNAMIC DATA, filed on even date herewith, which are hereby incorporated by reference in their entirety.

To explain the present embodiment, and not by way of limitation, the term "member" or "group" may be used interchangeably throughout, being clear that either a member dependent structure or a group dependent structure may be similarly used in most circumstances, and indeed, a member dependent indexing structure can be created as a group dependent indexing structure that is associated with a single member.

In an embodiment, every time a new version of software is installed for the first time, a group is created or is otherwise associated with the new version. One or more group/member dependent indexing structures, such as group/member dependent key or link, are associated with the new group. As noted above, if the appropriate group/member dependent indexing structures do not yet exist, then they are created with the correct data to correspond to the version corresponding to the new group. If the appropriate group/member dependent indexing structures already exist, then nothing further needs to be done to create such structures, and they can be used to upgrade to the correct version, subject to the need to create a data transformation function to address dynamic shared data.

Using the present embodiment, multiple such groups may co-exist in the system, since the group/member dependent indexing structures allow accurate correspondence between the different versions of the data and the members that are intended to access that data. Therefore, multiple different versions of the software may be concurrently supported in the same distributed system. This tolerance for different versions can span over an indefinite period of time, so long as the appropriate member/group dependent structures are used to ensure suitable access to the correct version of the data for the members of the system.

Illustrative Embodiments For Managing Private Data

To illustrate an example of a problem that may occur during a rolling upgrade, and referring back to FIG. 1A, consider if member 1 undergoes a rolling upgrade such that the version of a software application running on member 1 now differs from the version of the software application running on members 2 and 3. At this point, the member private data 110 for member 1 may need to change because of the rolling upgrade, but the change should not be made to the member private data for members 2 and 3. However, making just the change for the member private data 110 corresponding to member 1 may be difficult in conventional systems since each of the member private data 110, 112, and 114 may be accessed using the same key.

According to an embodiment of the invention, incompatible changes to member private data can be addressed by implementing member dependent keys (MDKs) or group dependent keys (GDKs) for the member/group private data. A MDK allows an application instance to create private data using a global namespace. Using a MDK allows each member, or a group of members with a GDK, to utilize the same key identifier to access or make changes to different data elements in the shared data 106.

Figure 2A:
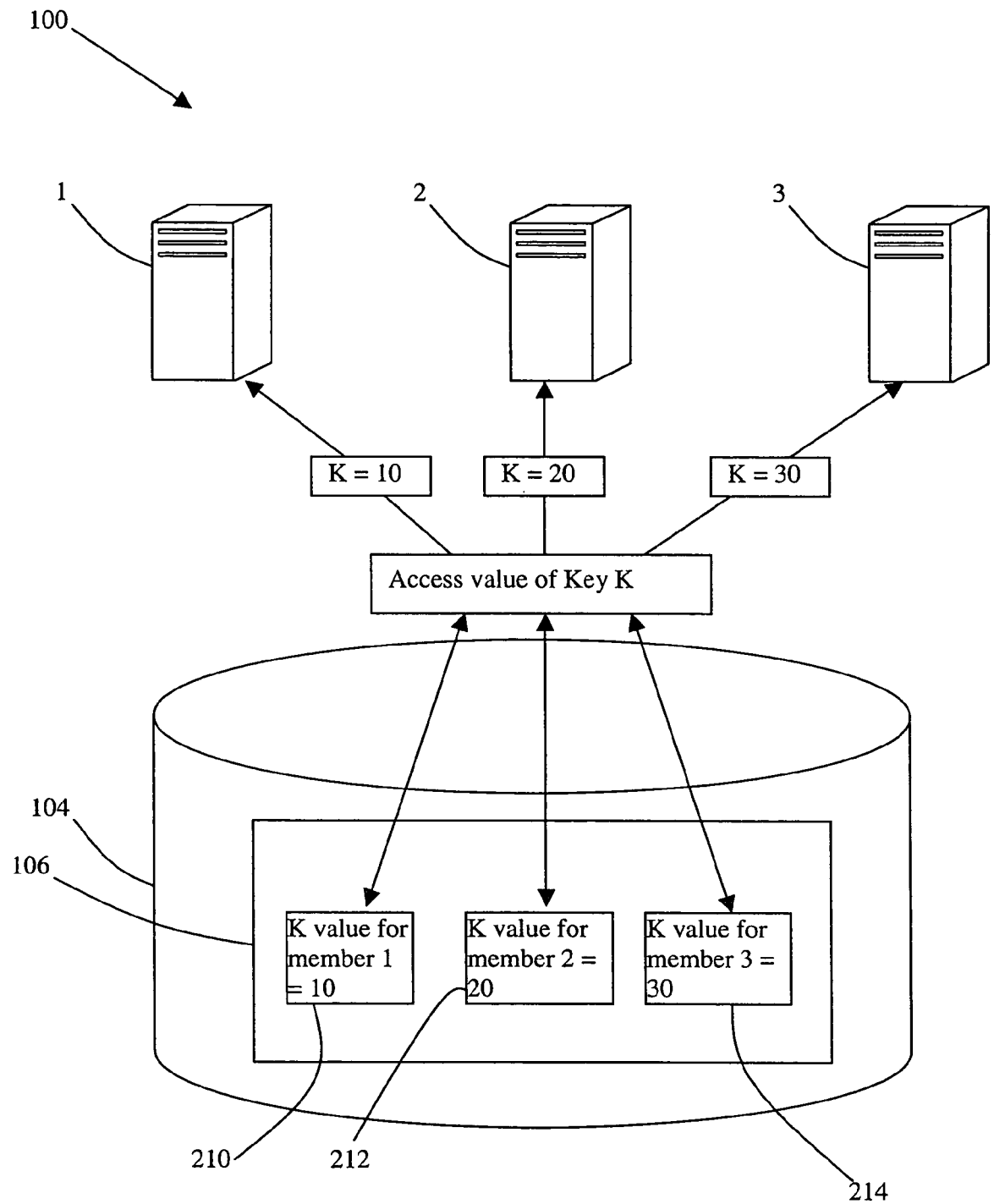
FIG. 2A shows an embodiment of the invention in which member dependent keys are used to access data.

FIG. 2A illustratively shows the application of MDKs to address incompatible changes to private data in a global namespace. For purposes of this example, a member dependent key K is referenced by members 1,2, and 3 in distributed system 100. The MDK is configured to relate to multiple sets of storage locations for private data 210, 212, and 214. The private data 210 stores a value of "10", private data 212 stores a value of "20", and private data 214 stores a value of "30". The MDK relates each set of private data 210, 212, and 214 to one or more members in the distributed system 100.

For the purposes of this example, assume that the MDK is configured such that private data 210 is accessed when member 1 references the shared key identifier K. Further assume that private data 212 is accessed when member 2 references the shared key identifier K and private data 214 is accessed when member 3 references the shared key identifier K. When member 1 seeks to access data corresponding to key K, the value "10" will be returned back to member 1. If member 1 seeks to modify the value of the data associated with key K, then the data at storage location for private data 210 is modified.

It is noted that while this example only shows a single member corresponding to each private data, the MDK may be configured such that multiple members access the same set of private data. This can be accomplished by using one or more group dependent keys (GDKs). In this approach, one or more groups are established to be associated with a GDK that is referenced by members 1, 2, and 3 using the key K. The GDK is configured to relate to multiple sets of storage locations for private data 210, 212, and 214 in which one or more members are associated with each group. Thus, private data 210 may be associated with a first group, private data 212 may be associated with a second group, and private data 214 may be associated with a third group. One or more default key values may also be maintained for members that are not associated with a group. Therefore, only members that are associated with the first group will access the private data at the location for private data 210. Any access to key K by the one or more members of the first group will retrieve or modify the value stored at the location for private data 210. Similarly, only members of the second and third groups will access the private data at the location for private data 212 and 214, respectively. Any access to key K by the one or more members of the first group or the second group will retrieve or modify the value stored at the location for private data 210 or 212, respectively.

It is noted that while this example only shows a single member corresponding to each private data, the MDK may be configured such that multiple members access the same set of private data. This can be accomplished by using one or more group dependent keys (GDKs). In this approach, one or more groups are established to be associated with a GDK that is referenced by members 1, 2, and 3 using the key K. The GDK is configured to relate to multiple sets of storage locations for private data 210, 212, and 214 in which one or more members are associated with each group. Thus, private data 210 may be associated with a first group, private data 212 may be associated with a second group, and private data 214 may be associated with a third group. One or more default key values may also be maintained for members that are not associated with a group. Therefore, only members that are associated with the first group will access the private data at the location for private data 210. Any access to key K by the one or more members of the first group will retrieve or modify the value stored at the location for private data 210. Similarly, only members of the second and third groups will access the private data at the location for private data 212 and 214, respectively. Any access to key K by the one or more members of the first group or the second group will retrieve or modify the value stored at the location for private data 212 or 214, respectively.

With these configurations in mind, consider again the example scenario in which member 1 undergoes a rolling upgrade that requires a change to private data. Assume that the private data is referenced by the shared key identifier K which corresponds to the MDK of FIG. 2A. Since the member private data is implemented as an MDK, when the rolling upgrade is performed, the desired data change can be made to member private data 210 for member 1 by accessing the shared key identifier K—without affecting any other member private data for the same key identifier corresponding to other members in the distributed system 100.

Similarly, desired data changes can be made to member private data 212 for member 2 by accessing the shared key identifier K, and again without affecting other member private data for members 1 and 3 in the distributed system 100. Desired data changes can be made to member private data 214 for member 3 by accessing the shared key identifier K without affecting member private data for members 1 and 2 in the distributed system 100. Therefore, changes to private data using this approach will advantageously prevent incompatible changes to data in the distributed system 100.

Figure 2B:
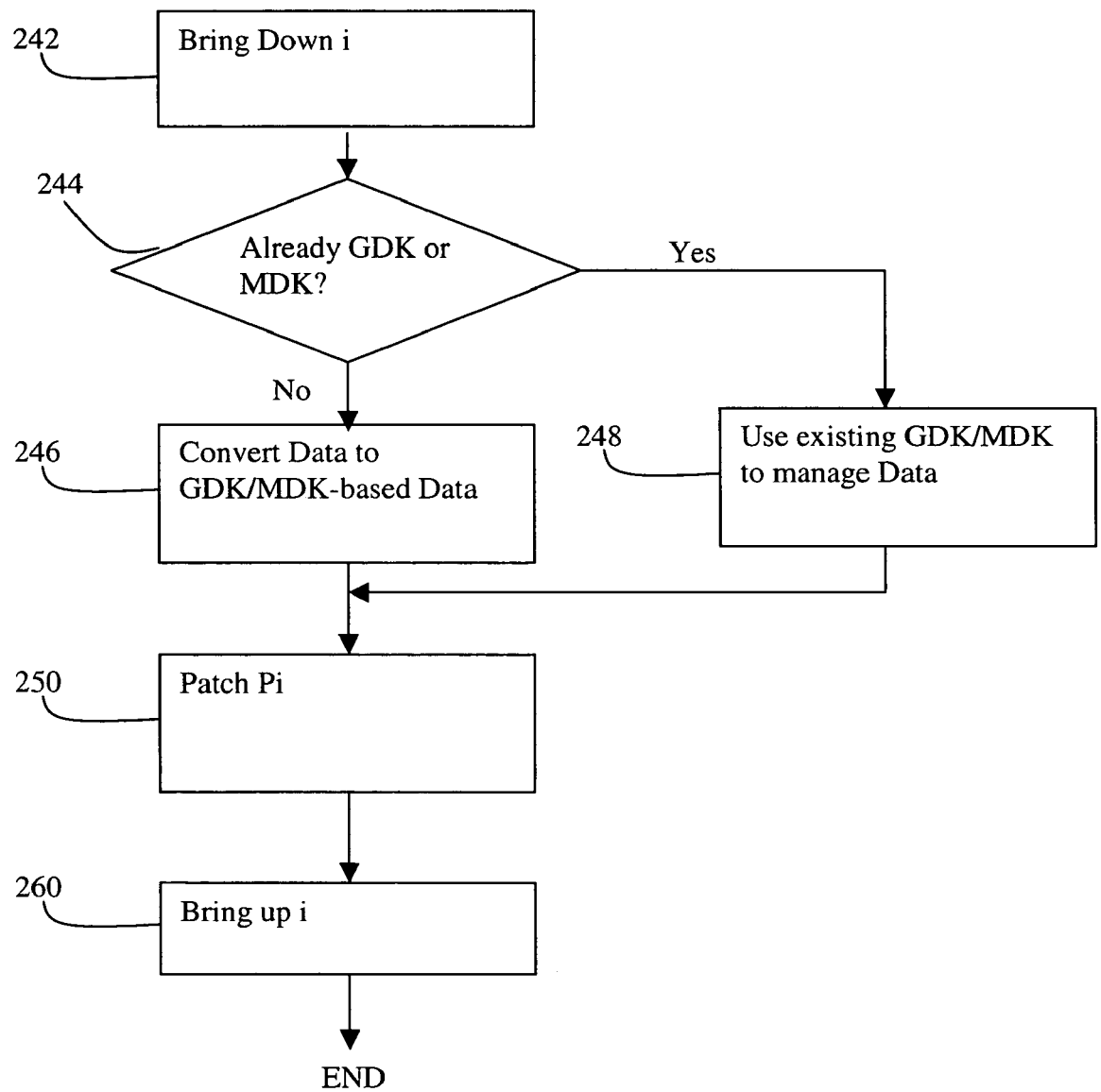
FIG. 2B shows a flowchart of a process for using group/member dependent keys to manage data according to an embodiment of the invention.

FIG. 2B shows a flowchart of a process for managing private data according to a present embodiment of the invention. For purposes of this example, assume that private data is stored as (key, value) pairs in a data repository. For this example, let Pi be an instance of a program P running on member i. Pi has a set of data, e.g., configuration data which is private to each member. The rolling upgrade process consists of bringing down each Pi, upgrading it, and bringing it back up again. So at any point in time, there could be different versions of program P running on different members in the distributed system.

At 242, the member i that is being upgraded, e.g., member 1, is brought down. Several different approaches can be taken to bring down member 1. One approach is merely to shut down the program P on member 1. This approach may be particularly appropriate for higher-level software applications. Another approach is to entirely shut down the member itself. This approach may be more appropriate for OS software. Other and additional approaches can be taken depending upon the specific requirements of the software application being upgraded.

A determination is made whether the data item of interest is already associated with a group or member dependent key (244). The GDK/MDK may already be in use if the developer had previously realized the possibility of a rolling upgrade. If the GDK/MDK already exists, then the above described approach of FIG. 2A can be immediately taken to access/change the data (248). The program Pi on instance i can be patched (250) and then brought up (260) to complete the upgrade process.

If the data item of interest had been implemented using a regular key, then the process first performs the operation of implementing the data item using a MDK or GDK (246). Several different approaches can be taken to perform 246. For example, the application developer may create an upgraded version of program Pi that directly implements group/members dependent structures to reference the data item. Alternatively, an external mechanism outside of the program Pi, e.g., at the system or operating system level, can be taken to specifically target implementation of a MDK or GDK for the data item. The program Pi can be patched (250) and then brought up (260) to complete the upgrade process. This process is performed for each member i of the distributed system until all members i have been appropriately upgraded.

Illustrative Embodiments For Managing Static Shared Data

Figure 3A:
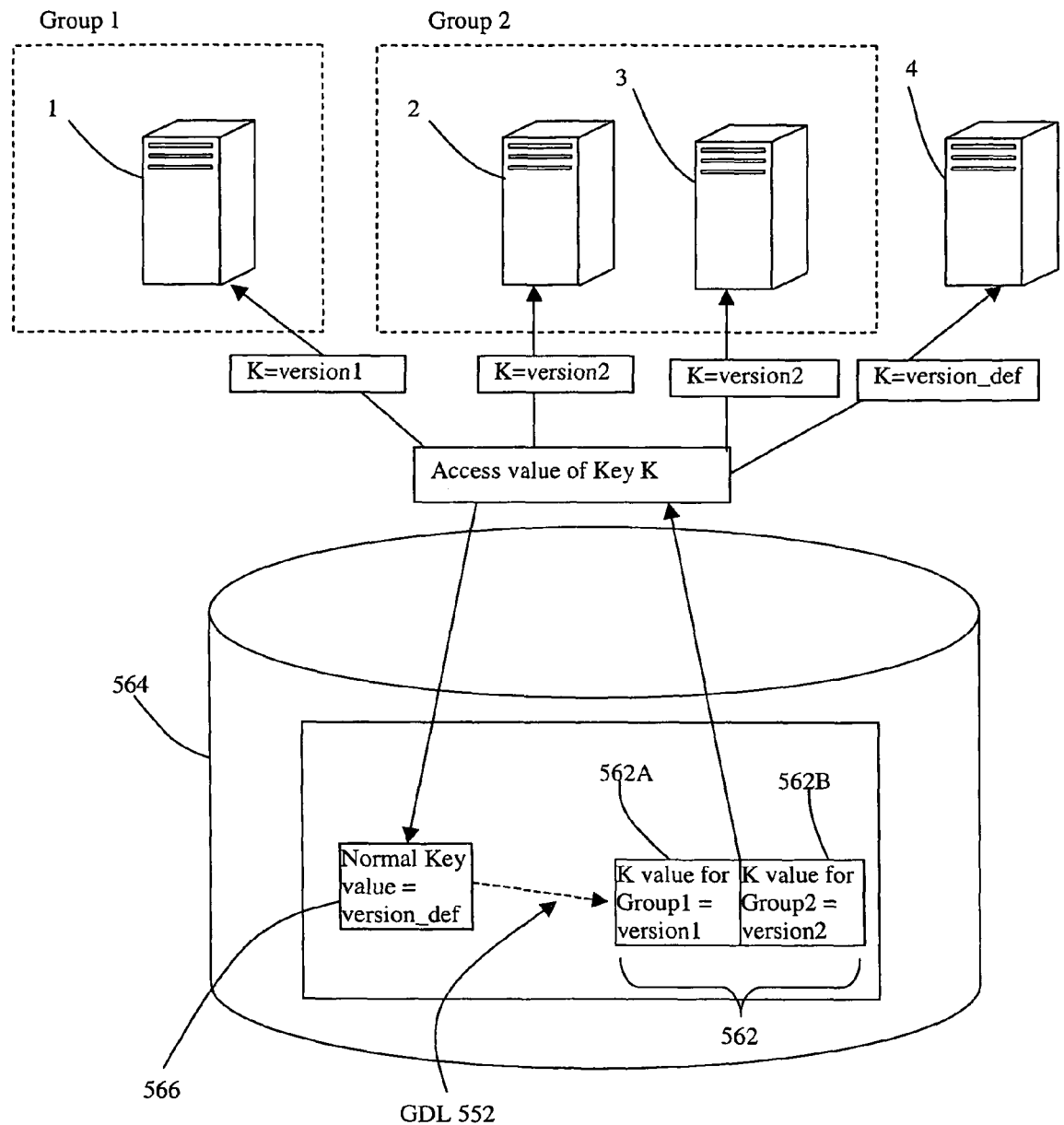
FIG. 3A-B shows embodiments of the invention in which group dependent links are used to access data.

To illustrate another example of a problem that may occur during a rolling upgrade, and referring to FIG. 3A, consider a configuration of a system having members 1, 2, 3 and 4. In this example configuration, there are three versions of data which is referenced by key K. Assume that member 1 has/will undergo a rolling upgrade such that the version of a software application running on member 1 now differs from the version of the software application running on members 2, 3, and 4. Members 2 and 3 have/will undergo the same upgrade such that members 2 and 3 will run the same version of the software, but will differ from the versions running on members 1 and 4. Member 4 has not yet undergone an upgrade and is operating against the default version of the software.

Static shared data may exist in the system that is accessed using the same key K by each member 1, 2, 3, or 4 in the distributed system. Assume that when the software application on member 1 is upgraded, the static shared data referenced by key K is also upgraded to version 1. The static shared data referenced by members 2 and 3 are at version 2. Member 4, not having undergone the upgrade, is still using the default version of the static shared data.

The problem is that that the three versions of the static shared data version1, version2, and version_default may be incompatible with each other. In other words, the version of the software application configured to operate with static shared data version1 will not properly work with members expecting static shared data version2 or version_default. Likewise, members expecting the static shared data version2 will not properly work with version1 and version_default, and members expecting static shared data version_default will not properly work with static shared data version1 and version2.

As noted above, every time a new version of software is installed for the first time in the distributed system, a new group is created or associated with the new version. For the example of FIG. 3A, Group 1 was created when software version 1 was installed on member 1. Group 2 is created when version 2 was installed on member 2. Group 2 was extended when the same new version is installed on another member, e.g., when version 2 is installed on member 3 (Group 2 is extended to include {2, 3}).

According to an embodiment of the invention, incompatible changes to static shared data can be addressed by implementing group/member dependent approaches, such as group dependent links (GDLs) and/or member dependent links (MDLs). A group dependent link (GDL) is a link between keys that is only visible for the members of a group for which it is created. If a key is a source of a GDL for a first group, then when that key is referenced by members of that group it will actually read the destination of the GDL. A member dependent link (MDL) can be formed by implementing a GDL in which the group associated with the GDL contains only a single member.

There are a number of approaches that can be used to implement a GDL. A first example approach is to implement the GDL as a link from a normal key to a group dependent key (GDK) or member dependent key (MDK). A second example approach is to implement the GDL as one or more private links (e.g., private symbolic links) to normal keys, in which each of the private links are associated with a group wherein members of the groups are directed to a specific normal key.

FIG. 3A conceptually illustrates the first example approach, in which the GDL is implemented as a link from a normal key to a group or member dependent key. In FIG. 3A, four Nodes/Members 1, 2, 3 and 4 are shown that access shared data on a shared disk 564. Assume that the key identifier K refers to a shared data item that is accessed by all four members. The default data storage element for key K is located at location 566 within shared disk 564.

Assume that member 1 is a member of Group 1 and that members 2 and 3 are both members of Group 2. It is further assumed that members of group 1 have undergone an upgrade such that its members need access to version1 of the data. Members of group 2 have undergone an upgrade such that its members need access to version2 of the data. Members that are not a member of any group have not undergone the upgrade and still need access to the default version of the data.

Here, nodes/members of the systems are by default configured to view a default version of the data referenced by key K (version_def), members of Group 1 view a first version of the data referenced by key K (version 1), and members of Group 2 are configured to view a second version of the data referenced by key K (version 2).

In the embodiment of FIG. 3A, this is accomplished by establishing a configuration of the system such that different entities in the system will link from the same key to different versions of shared data in the distributed system. A GDL 552 is established that links from the normal key K to the group dependent key 562. GDK 562 is associated with a first storage location 562A for the key value of K that is associated with members of Group 1 (i.e., version1). GDK 562 is also associated with a second storage location 562B for the key value of K that is associated with members of Group 2 (i.e., version2).

Any access to key K for members of group 1 will follow the GDL 552 to retrieve or modify the value stored at storage location 562A. Therefore, since member 1 is a member of Group 1, access by this member to key K would result in access to version 1 of the data at storage location 562A. Similarly, any member of Group 2 that seeks to access key K would be linked via GDL 552 to the value stored at storage location 562B. Therefore, since member 2 and member 3 are members of Group 2, access by these members to key K would cause these members to access storage location 562B to access version2 of the data item for key K.

Node/member 4 is not a member of any group, and will therefore access the version_def data stored at storage location 566. Additional MDKs and GDKs can be implemented to allow multiple versions of the shared data to be access by different groups in the system.

Figure 3B:
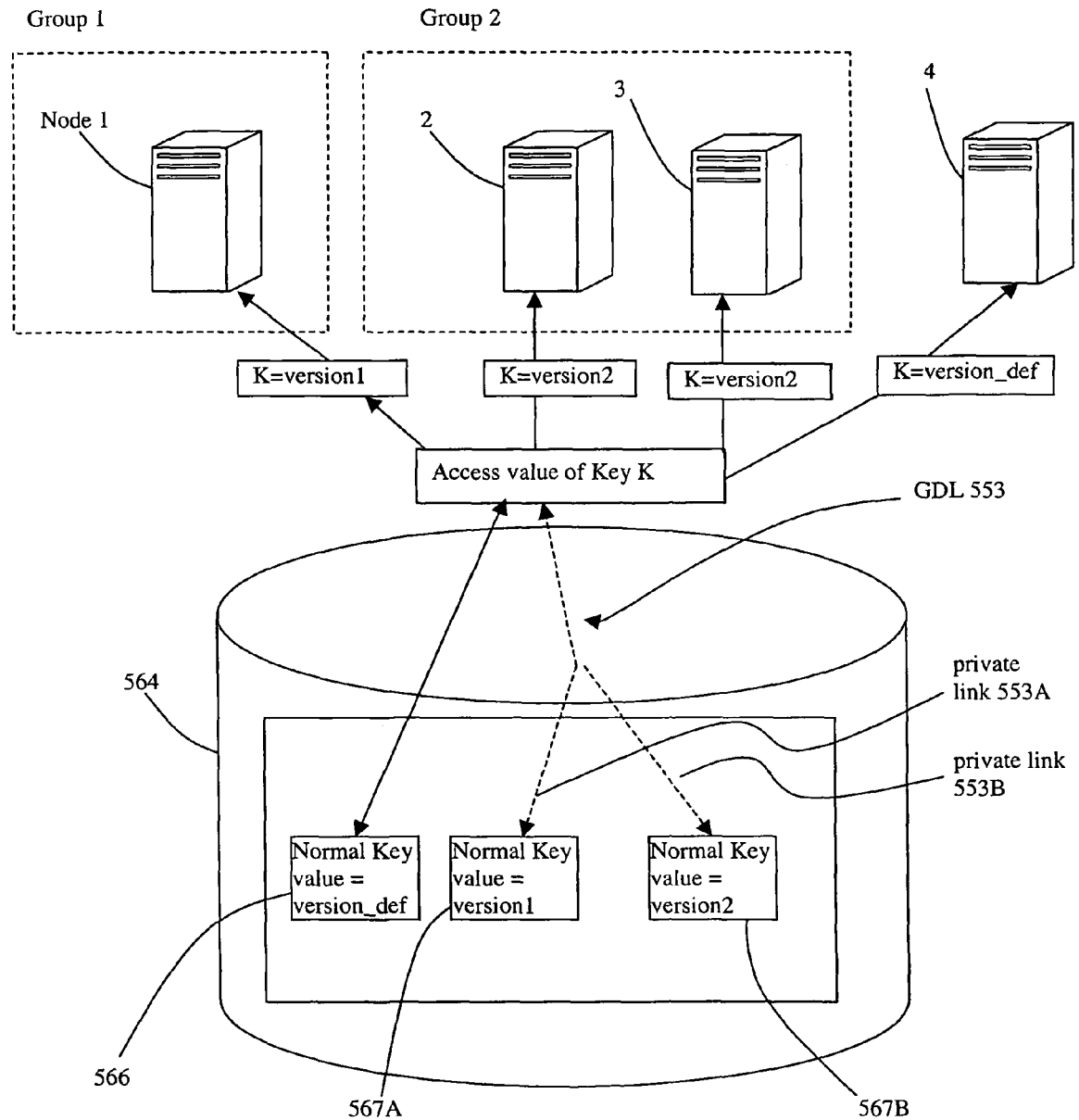

FIG. 3B conceptually illustrates the second example approach for implementing a GDL, which comprises one or more private links (e.g., private symbolic links) to normal keys, in which each of the private links are associated with a group wherein members of the groups are directed to a specific normal key. In FIG. 3B, four Nodes/Members 1, 2, 3, and 4 are shown that access shared data on a shared disk 564. As before, assume that the key identifier K refers to a shared data item that is accessed by all four members. The default data storage element for key K is located at location 566 within shared disk 564. Member 1 is a member of Group 1 and member 3 and 4 are both members of Group 2, in which members of the systems are by default configured to view a first version of the data referenced by key K (version_def), members of Group 1 view a first version of the data referenced by key K (version 1), and members of Group 2 are configured to view a second version of the data referenced by key K (version 2).

In the approach of FIG. 3B, the GDL 553 is implemented by establishing one or more private links 553A and 553B. In one embodiment, the private links are implemented using "private symbolic links". At this point, it is helpful to generally describe a symbolic link. A symbolic link is a logical reference from a first file/pathname to a second file/pathname, which is most commonly used in UNIX-based systems. Most activities (e.g., read and execute activities) that are called to operate upon the symbolic link are instead redirected to operate upon the filename referenced by the symbolic link. Unlike a standard symbolic link, a private symbolic link (PSL) does not provide a universally visible symbolic link between two file/pathnames. Instead, the PSL makes the link visible only to members or groups specified or authorized for the PSL. Further details regarding an example implementation and semantics of a PSL that can employed in one embodiment of the invention is described in co-pending U.S. application Ser. No. 10/803,623, filed on Mar. 17, 2004, entitled METHOD AND MECHANISM FOR PERFORMING A ROLLING UPGRADE OF DISTRIBUTED COMPUTER SOFTWARE, which is hereby incorporated by reference in its entirety.

Private link 553A is associated with Group 1 and is configured to point to the key/storage location 567A containing the value for key K that is associated with Group 1 (i.e., version 1). Therefore, GDL 553 will cause any members of Group 1 (e.g., Member 1) that seek to access key K to follow the appropriate private link for this group (i.e., private link 553A) to the specific key value location 567A that is associated with Group 1.

Similarly, private link 553B is associated with Group 2 and is configured to point to the key/storage location 567B containing the value for key K that is associated with Group 2 (i.e., version 2). Therefore, GDL 553 will cause any members of Group 2 (e.g., Members 4 or 5) that seek to access key K to follow the appropriate private link for this group (i.e., private link 553B) to the specific key value location 567B that is associated with Group 2.

Figure 4A:
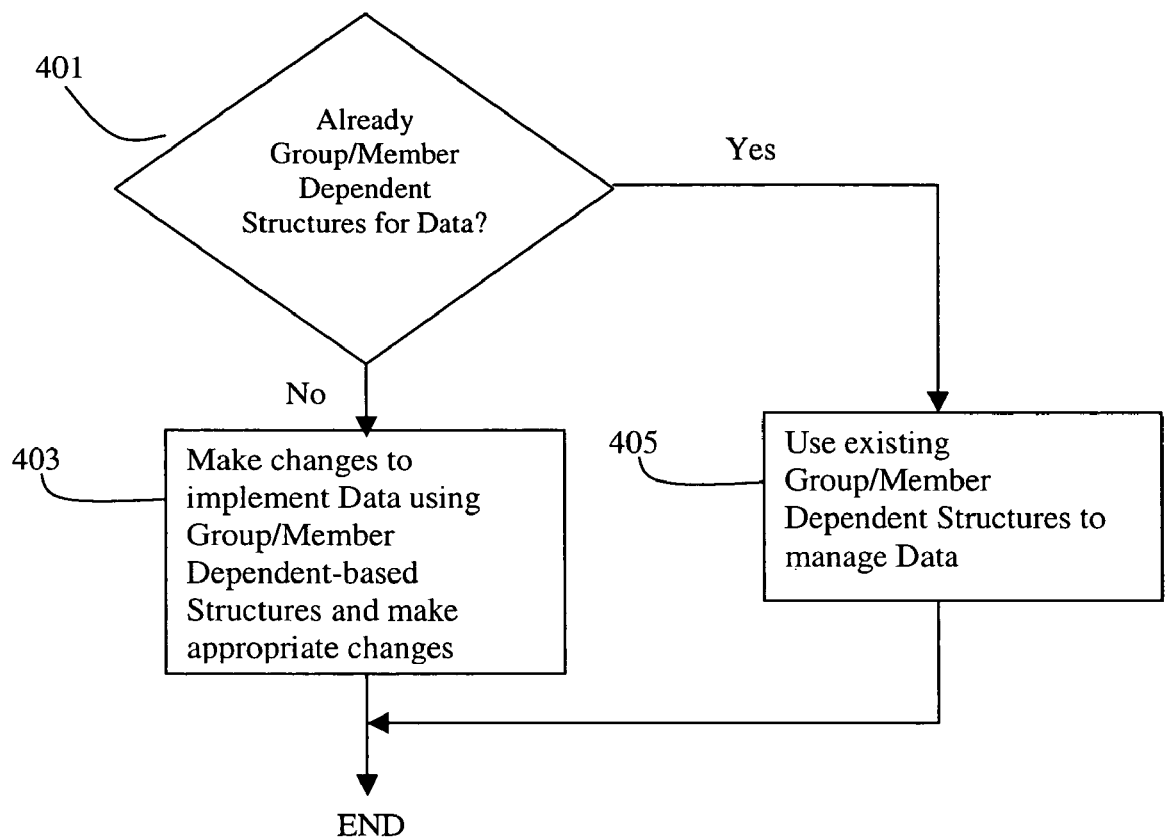
FIGS. 4A-B show flowcharts of a process for using Group/Member Dependent Structures to access shared data according to an embodiment of the invention.

FIG. 4A shows a flowchart of a process for managing static shared data, e.g., during a rolling upgrade, according to an embodiment of the invention. At 401 a determination is made whether the data of interest is already implemented using group/member dependent approaches. If so, then the existing structures are used to manage the changes to the data for the members/groups of interest (405).

If the data of interest was previously implemented using normal keys, then the changes are made to implement the static shared data during the rolling upgrade using group/member dependent approaches (403). One example approach for implementing this change is shown in the process flow of FIG. 4B.

Figure 4B:
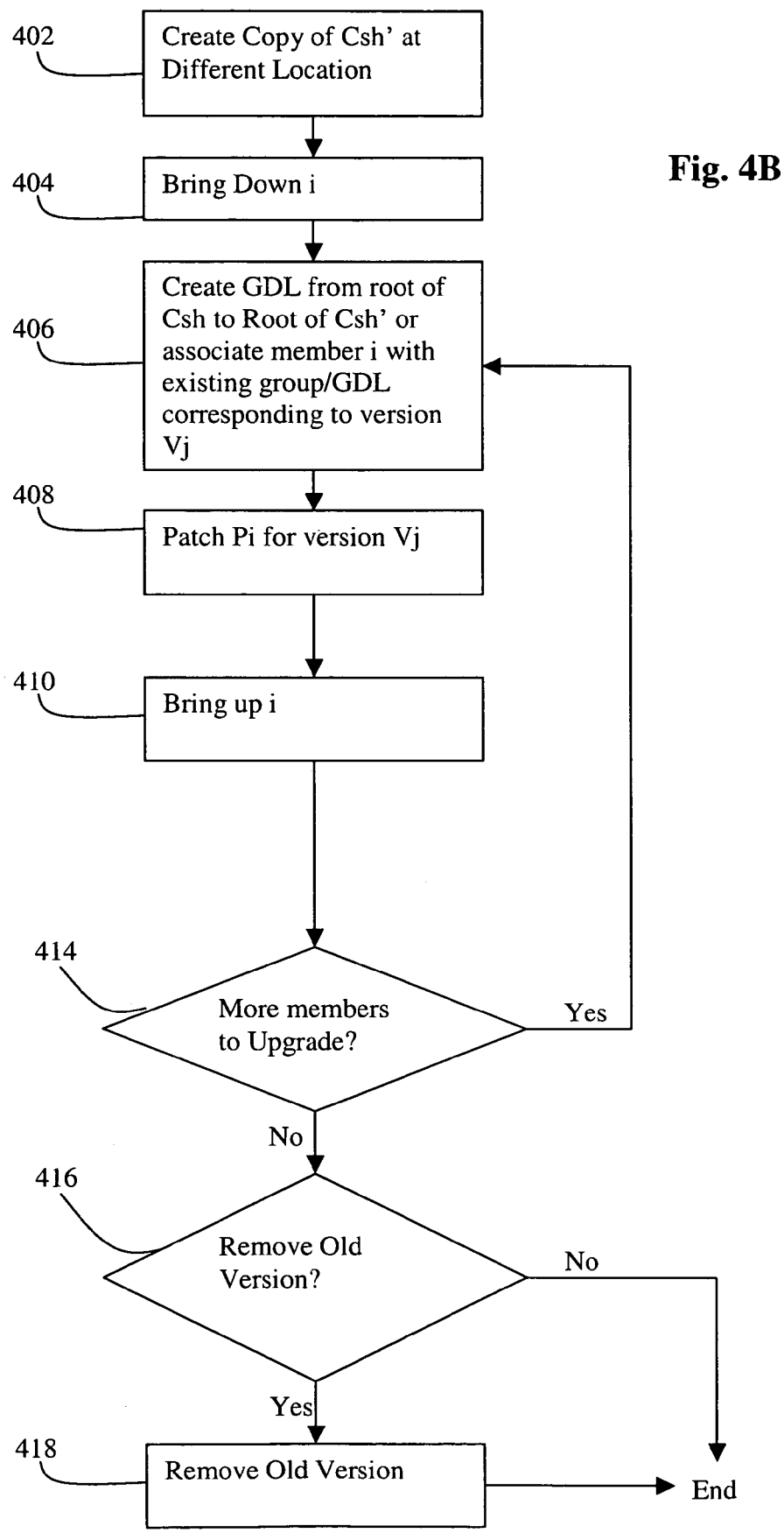

FIG. 4B shows a flowchart of a process for using GDLs to manage shared data during a rolling upgrade according to an embodiment of the invention. For purposes of this example, assume that shared data is stored as (key, value) pairs in a data repository, such as a configuration repository, e.g., the Oracle Cluster Repository (OCR) available from Oracle Corporation of Redwood Shores, Calif. For this example, let Pi be an instance of a program P running on member i. Pi has a set of data, e.g., configuration data Csh, which it shares with its peers. The rolling upgrade process consists of bringing down each Pi, upgrading it, and bringing it back up again. So at any point in time, there could be different versions of program P running on different members in the distributed system which need to interoperate with each other.

In one embodiment, the appropriate group/member dependent indexing structure is created for every group and only once per group. For the configuration shown in FIG. 3A, a GDL is created once for each of the two groups Group 1 and Group 2:

Csh→CshVersion1 (The first time for Group 1)
Csh→CshVersion2 (The first time for Group 2)

To implement this, at 402, an upgraded version (Version Vj) of Csh, referred to as Csh', is created at a different location from Csh. At 404, the member i that is being upgraded, e.g., member 1, is brought down. Several different approaches can be taken to bring down member i. One approach is merely to shut down the program P on member i. This approach may be particularly appropriate for higher-level software applications. Another approach is to entirely shut down the member itself. This approach may be more appropriate for OS software. Other and additional approaches can be taken depending upon the specific requirements of the software application being upgraded.

A GDL is created from the appropriate key(s) for Csh to the corresponding key(s) for Csh' for the group/member of interest (406). If the data is hierarchical in nature, then the GDL creates a link from the appropriate hierarchical position or root of Csh to the corresponding hierarchical location or root at Csh'. At 408, the program Pi is changed/upgraded corresponding to the new version Vj. One approach is to apply a patch or patch set to perform the upgrade to Pi. At 410, member i is brought back up again. Now, when member i attempts to access Csh, it will automatically point to Csh'.

At 414, a determination is made whether more members i need to be upgraded. If so, then each of the above steps are performed to the other member i of the distributed system. As noted above, only one GDL is needed for the same new version of the upgraded software. Therefore, if the additional member is being upgraded to a previously installed version, then the additional member can be associated with an existing group/GDL for the appropriate version and does not need to perform the action of creating a new GDL. In the present embodiment, all the members will point to the same upgraded version Csh' of the shared data. In this case, the process will repeat from 406 in which the pre-existing GDL will be associated with the other members since new copies/versions of the shared data will not have to be created again. On the other hand, if it is desired to create multiple copies or versions of the changed shared data, then the process will repeat from 402 for the members in which it is desired to create additional copies or versions of the shared data.

A determination can be made whether the old version of the shared data should be removed, e.g., if all members have been upgraded to use the latest version Csh' such that the older version of the data Csh is no longer needed (416). If so, then the old version of the shared data Csh is removed (418). At this point, the GDL can be removed and csh' can be configured to be the default data for the key associated with the shared data, with all members accessing the default data csh'.

Figure 5:
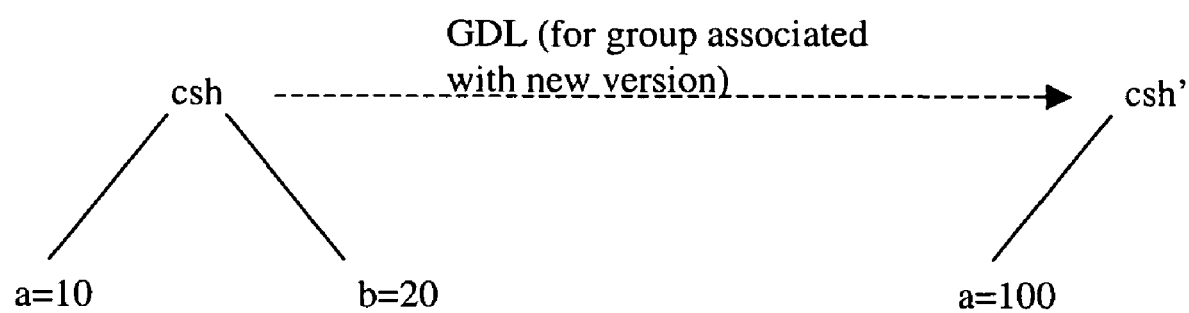
FIGS. 5 and 6 illustrate example circumstances for using NDLs.

FIG. 5 symbolically diagrams the effects of creating a GDL for an example shared data set. Assume that a first version of the shared data csh is hierarchical in nature in which the root of the data csh has two branches. A first branch csh.a has the value "10" and a second branch csh.b has the value "20". Further assume that a second version is different such that the second version of the data csh'.a has the value "100" and there is no longer any need for data item csh.b. Therefore, members will expect to see the value "10" when accessing key "csh.a" and will expect to see the value "20" when accessing key "csh.b". In contrast, members of a group associated with csh' will expect to see the value "100" when accessing key "csh.a" and will never need to access the key "csh.b".

As shown in FIG. 5, a GDL is created from the root of csh to the root of csh'. The approach of FIG. 5 shows the GDL as being unidirectional, although in alternative embodiments the GDL may be bidirectional or multidirectional. For any members of the group associated with the GDL, seeking access to any key within the hierarchy starting from the root of csh will be redirected to the root of csh'. Thus, a request for the data item for key csh.a from a member associated with the GDL will be automatically redirected to csh'.a. For any members not associated with any group corresponding to such GDLs, the default values for csh will be provided.

Figure 6:
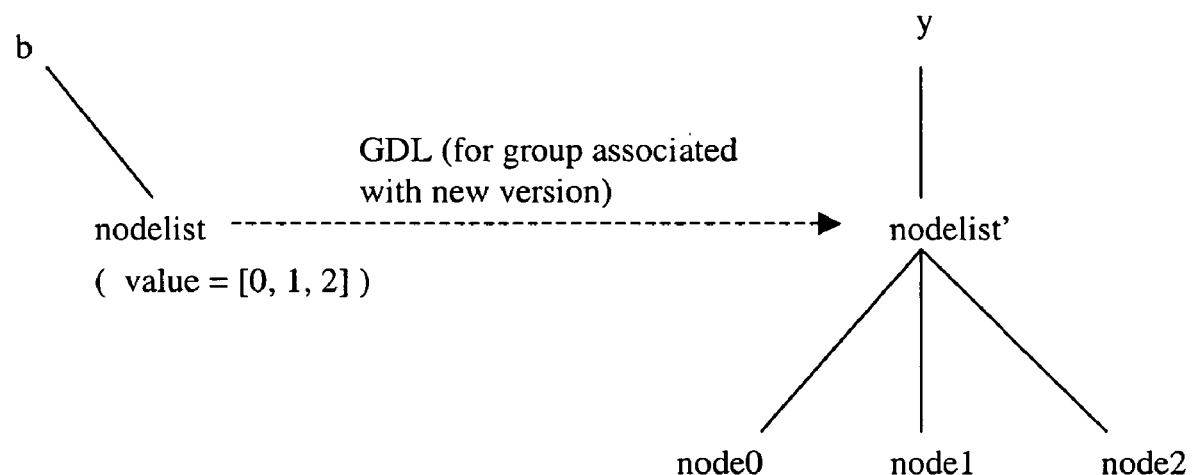

Complex structural differences to the shared data can also be addressed using this approach. Referring to FIG. 6, consider a first version of a data at key "b.memberlist". This key may refer, for example, to a configuration data element that corresponds to a list of members. For purposes of this example, assume that the range of values for this key is [0,1, 2]. Consider if a group of members is associated with a second version of the shared data for this key, in which the second version for this shared data item is different such that the member value actually becomes another leaf from the part of the hierarchical tree rooted at b.nodelist. Therefore, the second version includes additional key values "b.nodelist.node0", "b.nodelist.node1", and "b.nodelist.node2". This type of change can be implemented by creating an GDL at the proper location in the hierarchical tree, e.g., between "b.nodelist" for the first version of the shared data and "y.nodelist" in the second version of the shared data. Thus, for the member(s) of the groups associated with the GDL, a seamless and automatic redirection is performed to allow retrieval of the "b.nodelist.node0", "b.nodelist.node1", or "b.nodelist.node2" key values even though these keys do not even exist in the first version of the shared data, and vice versa.

Illustrative Embodiments For Managing Dynamic Shared Data

Turning to dynamic shared data, consider the effect of a rolling upgrade upon incompatibilities to dynamic shared data. As previously stated, dynamic shared data is the data that may be dynamically changed during the execution of an application program. As before, consider when member 1 undergoes a rolling upgrade such that the version of a software application running on member 1 now differs from the version of the software application running on members 2 and 3. Dynamic shared data 120 may exist in the system that is accessed using the same key K by each member 1, 2, or 3 in the distributed system 100. Assume that when the software application on member 1 is upgraded, the format/content of the shared data referenced by key K may also change to K'. As with static shared data, the two versions of the static shared data K and K' may be incompatible with each other. However, there is the added problem that the dynamic shared data may change over time. To maintain proper consistency of the data, the changes made to one version of the data should be reflected in the other version of the data. In other words, when a program makes a change to version K of the data, that change should also be reflected in version K', and vice versa.

In the present embodiment, this is accomplished by establishing one or more data transformation functions (DTFs) to coordinate changes to the different versions of the dynamic shared data. The DTF transforms the data structure of one version of the data item into the expected data structure of another version of the data item, and vice versa.

In one embodiment, a GDK or GDL is created with the version number as the group number for the member to be upgraded. A DTF is then specified to map the new version of data visible to this member to the data seen by the rest of the members i.e., from group <new version>→<default group>. As each member is upgraded, the <new version> group increases its membership and <default group> decreases its membership. Eventually when all versions get upgraded <new version> group consists of all the members of the distributed system and it ceases to become a GDK/GDL—it becomes a regular key again. Therefore, if there are g groups (including the default group), then $^gC_2$ transformations are specified.

Figure 7A:
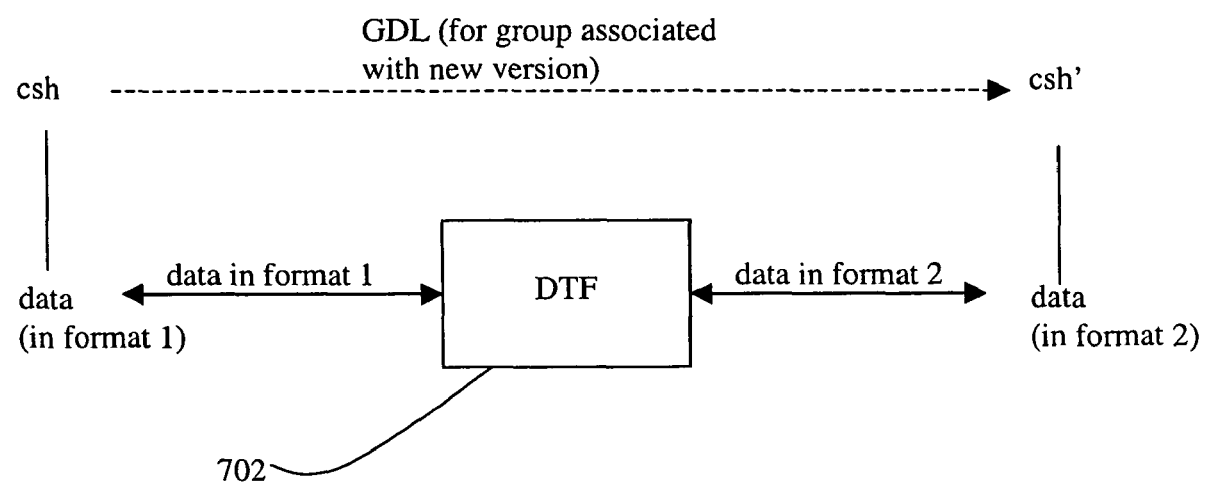
FIG. 7A-C illustrate using a data transformation function.

FIG. 7A symbolically diagrams an example of how a DTF can be used to address incompatible changes to dynamic shared data during a rolling upgrade. The data item of interest has the key "csh.data". The previous version of this shared data item is in a first format ("format 1"). When a rolling upgrade is performed to the application program, the expected format of this data items is now in a second format ("format 2"). Thus, all members operating the prior version of the program will expect the data at csh.data to be in format 1 and all members operating at the upgraded version of the program will expect the data to be in format 2. When a change is performed to the shared data by a member accessing the prior version (to csh.data in format 1), members of the upgraded group will need to see the changed data in the second format (csh'.data in format 2). Similarly, when a change is performed to the shared data by a member of the upgraded group (to csh'.data in format 2), members of the non-upgraded group will need to see the changed data in the first format (csh.data in format 1).

To address this problem, a link, e.g., a group dependent link (GDL) or member dependent link (MDL) is created at the appropriate point in the data hierarchy to redirect the data access to the new data location. For this example, the GDL points from the root of csh to the root of the changed data csh'. A DTF 702 is associated with the GDL. The DTF 702 performs the appropriate transformations between the different versions of the shared dynamic data. Here, DTF 702 provides transformation functionality between data in format 1 and data in format 2.

Whenever a member that operates against the previous version of the data makes a change to csh.data (which is in format 1), the DTF 702 makes the appropriate transformation to that changed data into format 2 and stores the transformed data into csh'.data. Similarly, whenever a member that operates against the new version of the data makes a change to csh'.data (which is in format 2), the DTF 702 makes the appropriate transformation to that changed data into format 1 and stores the transformed data into csh.data. In this way, any dynamic changes to the shared data is automatically reflected in the other versions of the shared data items.

By way of a simple example, consider if format 1 is data stored as binary numbers and format 2 is data stored as ascii numbers. The DTF 702 would include a binary_to ascii routine to convert changes to csh.data from format 1 to format 2 and a ascii_to_binary routine to convert changes from csh'.data from format 2 to format 1. Of course, the DTF can be configured to make any complexity of transformations to the shared data items, depending upon the specific application to which the invention is directed.

Figure 7B:
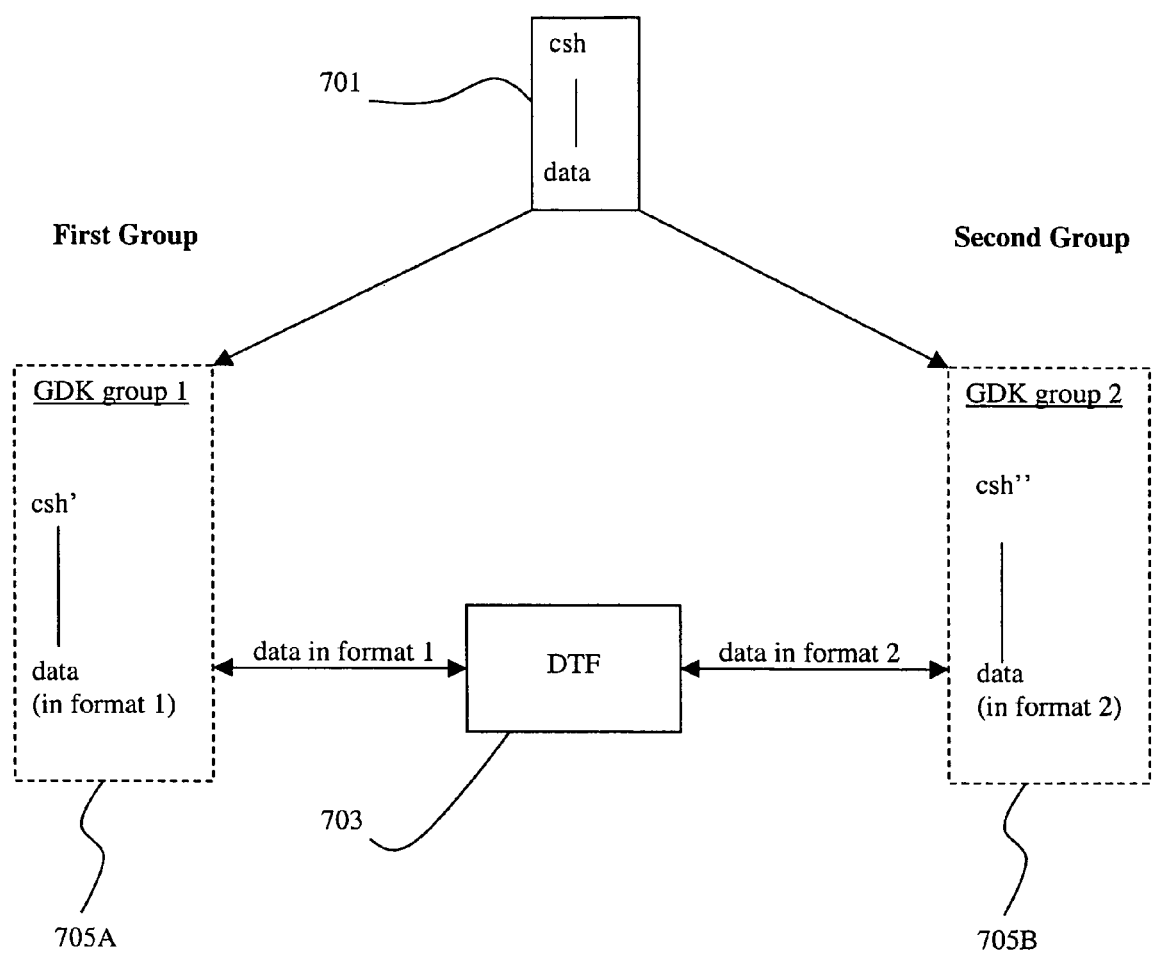

FIG. 7B symbolically diagrams how a DTF can be used with a GDK to address changes to dynamic shared data. Like the example of FIG. 7B, the data item of interest has the key "csh.data", in which members of a first group expect this shared data item to be in a first format ("format 1") corresponding to data at csh'.data and members of a second group expect this shared data item to be in a second format ("format 2") corresponding to data at csh".data. When a change is performed to the shared data by a member of the first group (to csh'.data in format 1), members of the second group will need to see the changed data in the second format (csh".data in format 2). Similarly, when a change is performed to the shared data by a member of the second group (to csh".data in format 2), members of the first group will need to see the changed data in the first format (csh'.data in format 1).

In FIG. 7B, a location 705A has been created to store data for the GDK for key csh.data for the first group. Whenever a member of the first group seeks to access key csh. data, that member will automatically access csh'.data at storage location 705A, which is stored in format 1. Similarly, a second location 705B has been created to store data for the GDK for key csh.data for the second group. Whenever a member of the second group seeks to access key csh. data, that member will automatically access csh".data at storage location 705B, which is stored in format 2.

A DTF 703 is associated with this GDK arrangement. The DTF 703 performs the appropriate transformations between the different versions of the shared dynamic data. Here, DTF 703 provides transformation functionality between data in format 1 and data in format 2.

Whenever a member of the first group makes a change to csh'.data (which is in format 1) at the GDK for storage location 705A, the DTF 703 makes the appropriate transformation to that changed data into format 2 and stores the transformed data into csh".data for the GDK at storage location 705B. Similarly, whenever a member of the second group makes a change to csh".data (which is in format 2), the DTF 703 makes the appropriate transformation to that changed data into format 1 and stores the transformed data into csh'.data. In this way, any dynamic changes to the shared data is automatically reflected in the other versions of the shared data items between the GDKs.

Figure 7C:
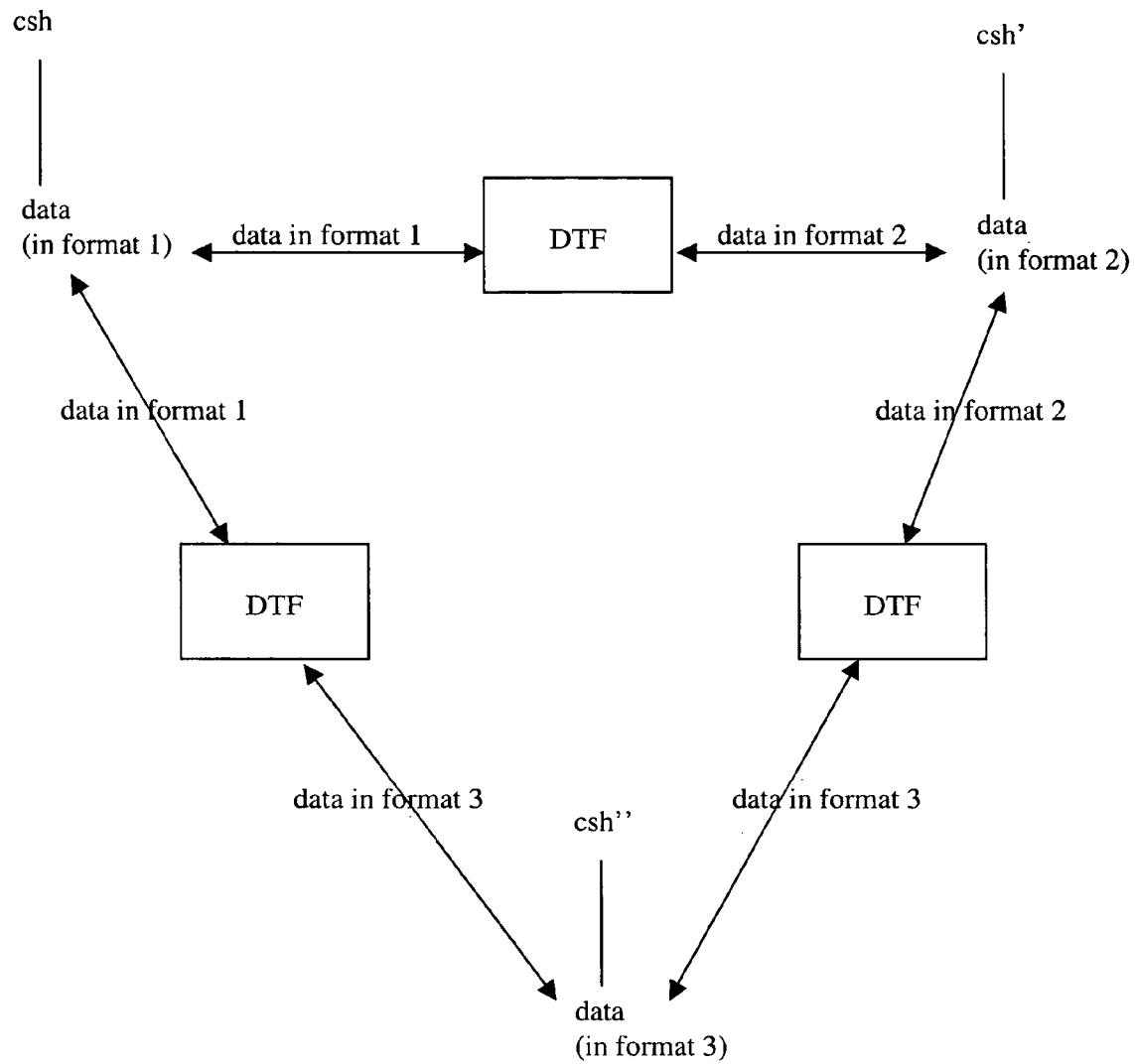

Referring to FIG. 7C, shown is an example configuration in which there are three groups of members, in which a separate DTF is associated between each of the formats that correspond to the different groups. It is noted that any number of DTFs may be employed for the same shared data item, and in one embodiment, the exact number of DTFs is dependent upon the exact data configuration and architecture to which the invention is directed.

Figure 8A:
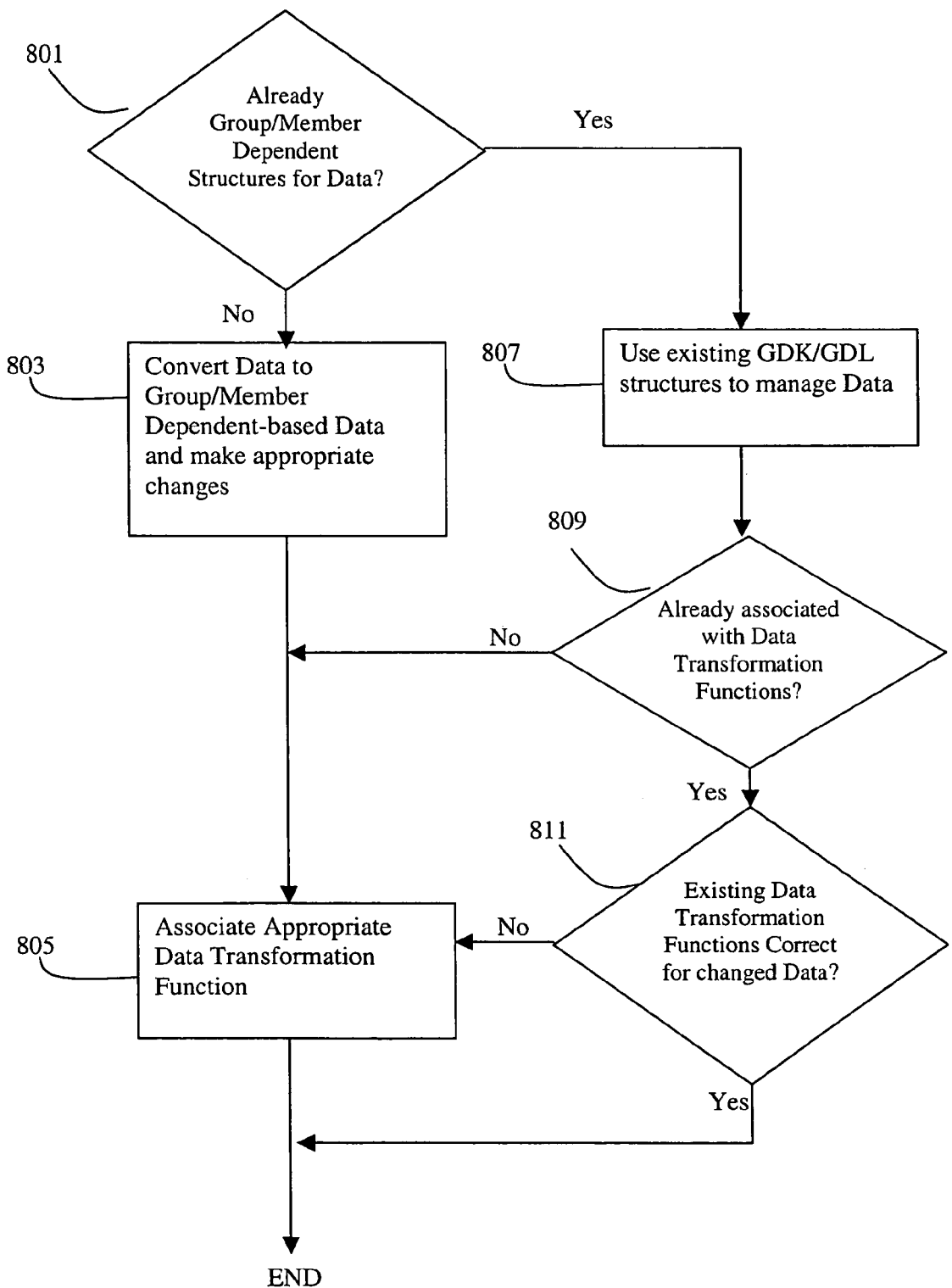
FIGS. 8A-B show flowcharts of a process for using a DTF according to an embodiment of the invention.

FIG. 8A shows a flowchart of a process for managing dynamic shared data, e.g., during a rolling upgrade, according to an embodiment of the invention. At 801 a determination is made whether the data of interest is already implemented using group/member dependent approaches. If not, then the data will be implemented using group/member dependent structures (803). One or more data transformation functions, as needed, will be created to provide the appropriate transformations between the different versions of the dynamic shared data (805).

If the dynamic shared data had previously been implemented using group/member dependent structures, then the existing structures are used to manage the changes to the data for the members/groups of interest (807). Next, a determination is made whether one or more data transformation functions already exist (809), e.g., in association with the data/ groups of interest. If not, then the appropriate data transformation functions are created and associated (805). If the data transformation function(s) already exist, a further determination is made whether the existing data transformation functions perform the appropriate types of transformations for the changed data (811). If so, then the process ends. If not, then the appropriate data transformation functions are created and associated at 805.

Figure 8B:
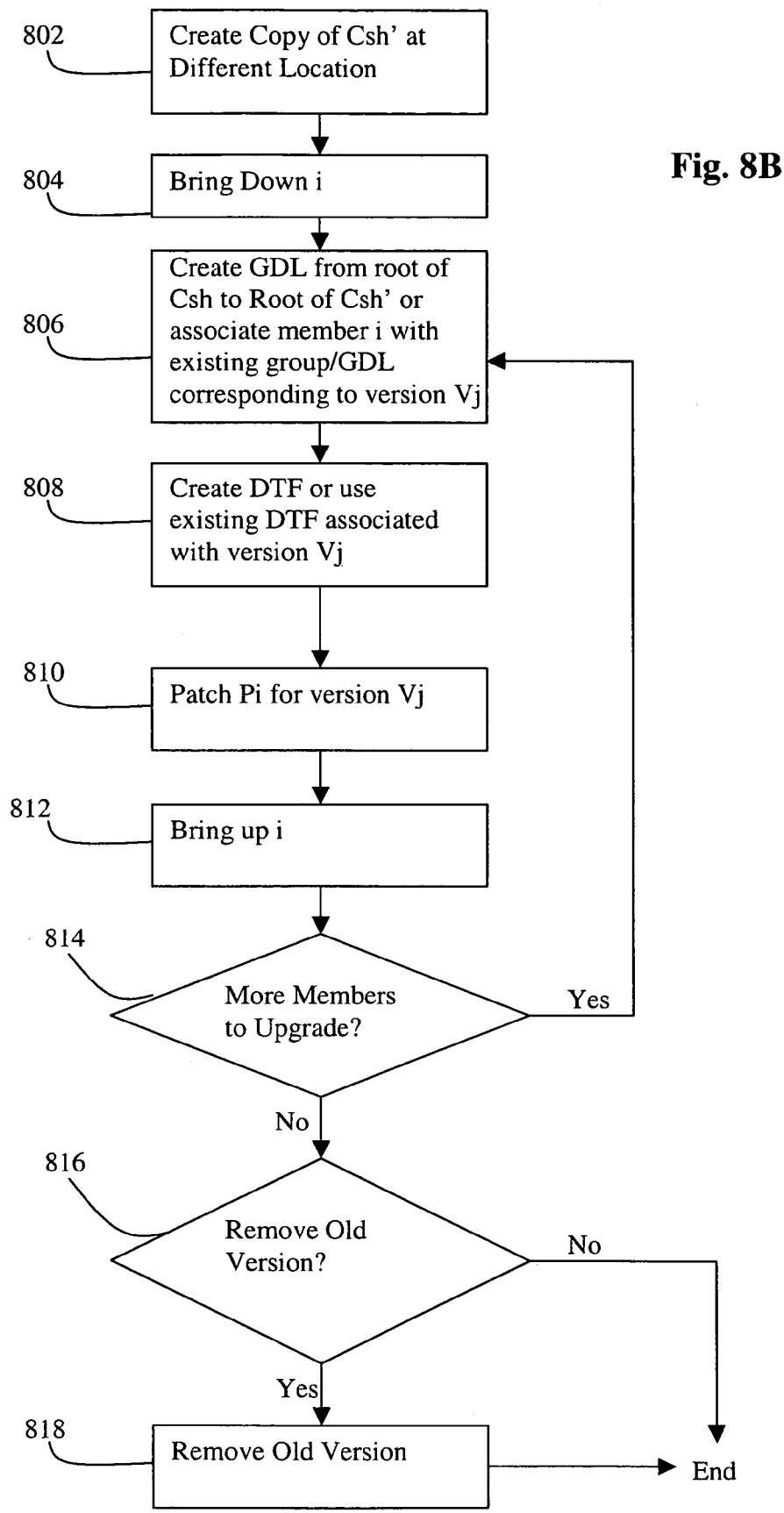

FIG. 8B shows a detailed flowchart of a process for using DTFs to manage incompatible data according to an embodiment of the invention. As before, assume that shared data is stored as (key, value) pairs in a data repository, such as a configuration repository. Pi is an instance of a program P running on member i. Pi has a set of data, e.g., configuration data Csh, which it shares with its peers. At 802, an upgraded version of Csh (for version Vj), referred to as Csh', is created at a different location from Csh. At 804, the member that is being upgraded, e.g., member 1, is brought down.

A GDL and/or GDK is created from the appropriate key(s) for Csh to the corresponding key(s) for Csh' for the member of interest (806). If the data is hierarchical in nature, then the GDL and/or GDK creates a link from the appropriate hierarchical position or root of Csh to the corresponding hierarchical location or root at Csh'. As noted above, in one embodiment, a new group is created when a new version of software is installed for the first time, and the appropriate group/member dependent indexing structure is created for every group and only once per group. If the appropriate GDL/GDK already exists, then the action to create a new GDL/GDK does not need to be performed.

If a suitable DTF does not already exist, then at 808, an appropriate DTF is created to provide the correct transformations between data items in Csh and data items in Csh'. The appropriate DTF may be created as a new DTF or by modifying an existing DTF. If a suitable DTF already exists, then it is used in the present process (808). If there are multiple versions of the same data item in the distributed system, then one or more DTF(s) may need to provide multiple levels of transformations. In addition, if the hierarchies extending beneath Csh and Csh' have multiple data items, then multiple DTFs may need to be created corresponding to the multiple data items.

At 810, the program P1 is changed/upgraded for the new version Vj. One approach is to apply a patch or patch set to perform the upgrade to P1. At 810, member i is brought back up again. Now, when member i attempts to access Csh, it will automatically point to Csh'. At this point, when changes are dynamically made to the Csh data items, the DTF will automatically cause those changes to be reflected in the correct format for the equivalent Csh' data items. Similarly, when changes are dynamically made to the Csh' data items, the DTF will automatically cause those changes to be reflected in the correct format for the equivalent Csh data items.

At 814, a determination is made whether more members i need to be upgraded. If so, then each of the above steps are performed to the other members i of the distributed system. As noted above, only one GDL is needed for the same new version of the upgraded software. Therefore, if the additional member is being upgraded to a previously installed version, then the additional member can be associated with an existing group/GDL for the appropriate version and does not need to perform the action of creating a new GDL (806). In one embodiment, all the members will point to the same upgraded version Csh' of the shared data. In this case, the process will repeat from 806, in which the pre-existing GDL will be associated with the other members since new copies/versions of the shared data will not have to be created again. On the other hand, if it is desired to create multiple copies or versions of the changed shared data, then the process will repeat from 802 for the members in which it is desired to create additional copies or versions of the shared data.

A determination can be made whether the old version of the shared data should be removed, e.g., if all members have been upgraded to the latest version Csh' such that the older version of the data Csh is no longer needed (816). If so, then the old version of the shared data Csh is removed (818). At this point, the GDL/GDK and the DTF can be removed and csh' can be configured to be the default data for the key associated with the shared data, with all members accessing the default data csh'.

Example BNF grammar that specifies a language for implementing DTFs is described in co-pending U.S. application Ser. No. 10/845,016, filed on even date herewith, which is hereby incorporated by reference in its entirety. The following are examples of transformations and corresponding DTFs. For the following examples, consider a key a.b for a GDK. The DTFs are in '[''] and they follow the grammar as set forth above.

EXAMPLE 1

The first example involves three groups (Group 1, Group 2, and Group 3), and parallels the example configuration shown in FIG. 7C:

Group1 a.b.c[V1]—Key name is a.b.c and the value of this key is V1

Group 2 a.b.c[V1+8]—Key name is a.b.c and the value of this key is V1+8

Group 3 a.b.c[V1+4]—Key name is a.b.c and the value of this key is V1+4

The following DTF describes the transformation functions between different groups for this key-value:

[(Group1<a.b.c_value; Group2>a.b.c_value, transform1_Group1_Group2( ))

(Group3<a.b.c_value; Group2>a.b.c_value, transform2_Group3_Group2( ))

(Group3<a.b.c_value; Group1>a.b.c_value, transform3_Group3_Group1( ))]

The '_value' signifies that the transformation is to be applied on the value of the key. Keys have values and other attributes (properties) like security attributes etc. Our claim can be extended to include any number of attributes keys may have in some implementation.

EXAMPLE 2

The second example involves two groups in which the transformation is affected by the hierarchical nature of one or more of the data elements/structures:

Group1 a.b.c[V1] a.b.d[V2]

Group 2 a.b.f[V1+V2]

[(Group1<a.b.*_value; Group2>a.b.f_value, transform1_Group1_Group2( ))]

In this example, '*' is a syntactic element of the language describing the GDKs. Mention of a.b.* in the above DTF signifies that the transformation is applied on all the children of key a.b.

EXAMPLE 3

The third example shows an approach that addresses the situation when the different groups are associated with shared data having different hierarchical structures.

Group1 a.b.c a.b.d

Group 2 a.b.c

[(Group1<a.b.d; Group2>NULL, transform1_Group1_Group2( ))]

In this example, the key a.b.d does not exist for Group2.

EXAMPLE 4

The next example combines approaches shown in Example 2 and Example 3:

Group1 a.b.c.x[V1] a.b.c.y[V2] a.b.c.z[V3]

Group 2 a.b.c[V1*V2*V3]

[(Group1<a.b.c.*_value; Group2>a.b.c_value, transform1_Group1_Group2( ))]

EXAMPLE 5

In this example, key a is a GDK and it does not exist for Group2, it only exists for Group1.:

Group1 a.b.c

Group 2

[(Group1<a.*; Group2>NULL, transform1_Group1_Group2( ))]

EXAMPLE 6

For this example, consider the following groups:

Group1 a.b.c(RWX)—RWX are security attributes of the key. Each of the letters

Group 2 a.b.c(R—)

'R', 'W', 'X' signify certain privileges that are granted to certain categories of users. The security attribute can have any arbitrary form in different implementations. This is just an illustrative example.

For Group2 the key a.b.c does not grant any privilege to two of the three categories of users.

[(Group1<a.b.c_security; Group2>a.b.c_security, transform1_Group1_Group2( ))]

Therefore, what has been described is an approach for managing incompatibilities to data. It is noted that the present invention can be used to manage incompatible data in many contexts, not just for rolling upgrades. For example, the present invention can be used to manage any application in which it is desired to maintain different versions of the same data item. The present invention can be applied to manage any type of data, and not just hierarchical data. For example, the present invention can be used to manage relational data as well as unstructured data. The present approaches may be used to handle access and maintenance to the shared web pages (or the data that appear on the shared web pages). Other types of differences and incompatibilities may also be managed by the present invention, e.g., based upon geographical or language differences in a set of shared data. For example a single set of shared data may have different language presentations depending upon the location of the enduser or client that seeks to access the shared data, which can be handed using he present invention. Any type of data usable by a system may be managed using the present invention, including data used by or related to application software, operating systems software, firmware, or hardware devices.

System Architecture Overview

Figure 9:
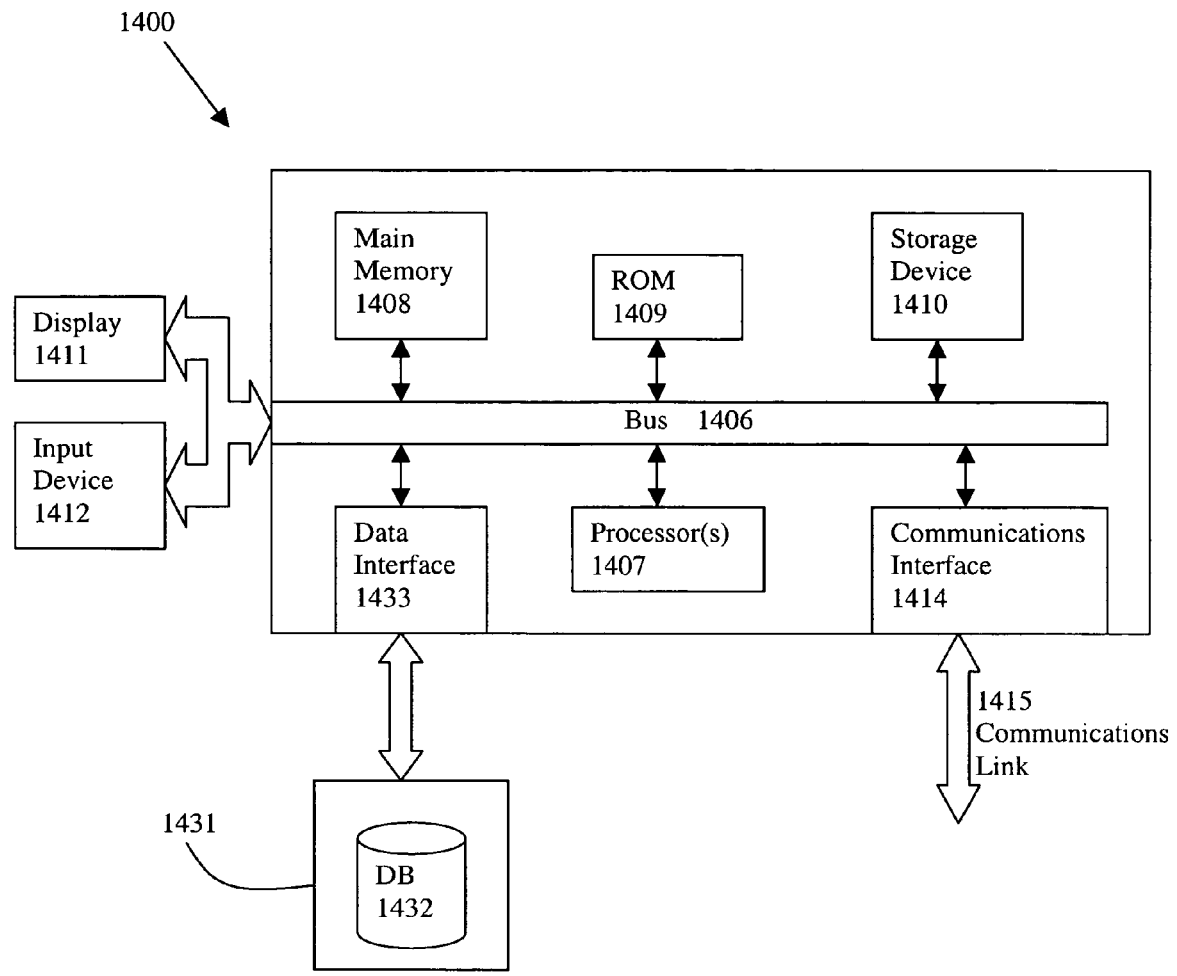
FIG. 9 is a diagram of a computer system with which the present invention can be implemented.

The execution of the sequences of instructions required to practice the invention may be performed in embodiments of the invention by a computer system 1400 as shown in FIG. 9. As used herein, the term computer system 1400 is broadly used to describe any computing device that can store and independently run one or more programs. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

Each computer system 1400 may include a communication interface 1414 coupled to the bus 1406. The communication interface 1414 provides two-way communication between computer systems 1400. The communication interface 1414 of a respective computer system 1400 transmits and receives signals, e.g., electrical, electromagnetic or optical signals, that include data streams representing various types of information, e.g., instructions, messages and data. A communication link 1415 links one computer system 1400 with another computer system 1400. A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives signals, e.g., electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407. The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407. A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium" or "computer-readable medium" as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for managing data relating to an operation that causes an incompatibility for the data, the method comprising:

using a processor programmed for performing a process comprising:

determining if the data is already implemented using a shared dependent indexing structure for a first group of one or more members to access a first version of the data and a second group of one or more members to access a second version of the data;

if the data is not already implemented using the shared dependent indexing structure, then implementing the data using at least the shared dependent indexing structure, wherein the act of implementing the data comprises:

generating a first dependent key for the first group, a second dependent key for the second group, and a dependent link, in which the dependent link comprises a first private link, which links a shared normal key to the first dependent key, and a second private link, which links the shared normal key to the second dependent key; and perform the operation that causes the incompatibility between the first version and the second version of the data, wherein the shared dependent indexing structure allows the first version of the data to be accessible by the first group but not by the second group and allows the second version of the data to be accessible by the second group but not by the first group, the data comprise a first type which is dynamic and a second type which is static, in which, in a presence of the incompatibility the first type is handled with one or more transformation functions and the shared dependent indexing structure, wherein the one or more transformation functions transform the first version of the data of the first type into the second version of the data of the first type, and the second type is handled with at least the shared dependent indexing structure.

2. The computer implemented method of claim 1, in which the data is implemented using the dependent indexing structure by a developer that create an application related to the data.

3. The computer implemented method of claim 2, in which the dependent indexing structure is a group dependent key.

4. The computer implemented method of claim 2, in which the dependent indexing structure is created in anticipation of a change which creates the incompatibility.

5. The computer implemented method of claim 1, in which operation comprises a rolling upgrade or downgrade operation associated with the data.

6. The computer implemented method of claim 1, in which the data is used by or related to application software, operating system software, firmware, or a hardware device.

7. The computer implemented method of claim 1, in which the dependent indexing structure is configured as a member dependent indexing structure or a group dependent indexing structure.

8. The computer implemented method of claim 1, in which the dependent indexing structure is created as part of a version of a related software application.

9. The computer implemented method of claim 1, in which the dependent indexing structure is created using a mechanism that is external to a related software application.

10. The computer implemented method of claim 1, in which multiple different versions of the data coexist.

11. The computer implemented method of claim 10, in which the multiple different versions co-exist over an indeterminate period of time.

12. The computer implemented method of claim 1, in which the data comprises hierarchical data, relational data, or unstructured data.

13. The computer implemented method of claim 1, in which the data comprises private data, static shared data, or dynamic shared data, and in which the act of implementing the data using the at least the dependent indexing structure comprises:
managing private data with a group dependent key or link;
managing static shared data with a dependent link or key; and
managing dynamic shared data with the one or more data transformation functions which translates one version of the data into another version of the data.

14. The computer implemented method of claim 13, in which the group dependent key provides a private data with a global namespace.

15. The computer implemented method of claim 14, in which the global namespace is a global key.

16. The computer implemented method of claim 13, in which the group dependent key has only a single associated member.

17. The computer implemented method of claim 16, in which the group dependent key is a member dependent key.

18. The computer implemented method of claim 13, in which the dependent link is a member dependent link having a single member associated with the dependent link.

19. The computer implemented method of claim 13, in which the dependent link establishes a link from a key to a second version of the static shared data.

20. The computer implemented method of claim 19, in which the link to the second version of the static shared data is only visible to a member associated with the dependent link.

21. The computer implemented method of claim 20, in which the link to the second version of the static shared data is not visible to a member not associated with the dependent link.

22. The computer implemented method of claim 13, in which the dependent link is implemented as a link to a member dependent key.

23. The computer implemented method of claim 13, in which the dependent link forms a link from a root of a first version of data to the intended root of another version of the data.

24. The computer implemented method of claim 13, in which the data transformation function automatically transforms an associated data item from a first format for the dynamic shared data to a second format for the dynamic shared data.

25. The computer implemented method of claim 24, in which the data transformation function transforms the data in both directions.

26. The computer implemented method of claim 24, in which the dependent link is established for the dynamic shared data.

27. The computer implemented method of claim 13, in which the data is managed for a rolling upgrade.

28. The computer implemented method of claim 1, in which the data comprises web pages, language specific data, or geographic specific data.

29. The computer implemented method of claim 13, in which the act of managing the static shared data with the dependent link comprises:
identifying the first version of the data;
creating the second version of the data at a second location, wherein the second version is not compatible with the first version of the data;
creating the dependent link from the first version of the data to the second version of the data; and
associating one or more members with the dependent link, wherein the one or more members are configured to be compatible with the second version of the data.

30. The computer implemented method of claim 29, in which the dependent link is from the root of the first version of the data to the root of the second version of the data.

31. The computer implemented method of claim 29, in which the act of associating the one or more members with the dependent link comprises:
bringing down a member i;
making the member i a member of the group associated with the dependent link;
configuring the member i to be compatible with the second version of the data; and
bringing up the member i.

32. The computer implemented method of claim 29, further comprising:
removing the first version of the data.

33. The computer implemented method of claim 29, in which the act of managing the dynamic shared data is implemented with the process, the process further comprising:
creating the one or more data transformation functions between the first version and the second version.

34. The computer implemented method of claim 33, in which the one or more data transformation functions automatically perform one or more transformations between a first format associated with the first version and a second format associated with the second version.

35. The computer implemented method of claim 34, in which the one or more transformations are performed if either the first version or the second version of the data is changed.

36. The computer implemented method of claim 33, in which multiple data transformation functions are created to handle three or more different versions of the data.

37. A computer implemented method for managing incompatible data relating to an operation that causes incompatibility for the data, the method comprising:

using a processor programmed for performing a process comprising:

identifying a first version of data;

identifying a second version of the data at a second location, wherein
the second version is not compatible with the first version of the data;

creating a first dependent key for the first version, a second dependent key for the second version, and a dependent link, wherein
the dependent link comprises a first private link, which links a shared normal key to the first dependent key, and a second private link, which links the shared normal key to the second dependent key; and associating one or more members of a first group and one or more members of a second group with the dependent link, wherein
the one or more members of the first group are configured to be compatible with the first version of data and the one or more members of the second group are configured to be compatible with the second version of the data,
the dependent link allows the first version of the data to be accessible by the one or more members of the first group but not by the second group and allows the second version of the data to be accessible by the one or more members of the second group but not by the first group, and
the data comprises a first type which is dynamic and a second type which is static, in which, in a presence of the incompatibility
the first type is handled with one or more transformation functions and the shared dependent indexing structure, wherein the one or more transformation functions transform the first version of the data of the first type into the second version of the data of the first type, and
the second type is handled with at least the shared dependent indexing structure.

38. The computer implemented method of claim 37, in which the dependent link is from a root of the first version of the data to a root of the second version of the data.

39. The computer implemented method of claim 37, in which the act of associating the one or more members with the dependent link comprises:
bringing down a member i;
making the member i a member of the group associated with the dependent link;
configuring the member i to be compatible with the second version of the data; and
bringing up the member i.

40. The computer implemented method of claim 39, in which the act of configuring the member i to be compatible with the second version of the data is performed by patching software associated with i.

41. The computer implemented method of claim 37, further comprising:
removing the first version of the data.

42. The computer implemented method of claim 41, in which the first version of the data is removed only if there are no members still requiring access to the first version.

43. The computer implemented method of claim 37, further comprising:
creating the one or more data transformation functions between the first version and the second version.

44. The computer implemented method of claim 43, in which the one or more data transformation functions automatically perform one or more transformations between a first format associated with the first version and a second format associated with the second version.

45. The computer implemented method of claim 44, in which the one or more transformations are performed if either the first version or the second version of the data are changed.

46. The computer implemented method of claim 43, in which multiple data transformation functions are created to handle three or more different versions of the data.

47. A computer program product embodied on non-transitory computer readable medium, the non-transitory computer readable medium having stored thereon a sequence of instructions which, when executed by a processor, causes the processor to execute a process for managing data relating to an operation that causes an incompatibility for the data, the process comprising:
using a processor for:
determining if the data is already implemented using a shared dependent indexing structure for a first group of one or more members to access a first version of the data and a second group of one or more members to access a second version of the data;
if the data is not already implemented using the shared dependent indexing structure, then implementing the data using at least the shared dependent indexing structure, wherein the act of implementing the data comprises:
generating a first dependent key for the first group, a second dependent key for the second group, and a dependent link, wherein the dependent link comprises a first private link, which links a shared normal key to the first dependent key, and a second private link, which links the shared normal key to the second dependent key; and
performing the operation that causes the incompatibility between the first version and the second version of the data, wherein
the shared dependent indexing structure allows the first version of the data to be accessible only by the first group but not by the second group and allows the second version of the data to be accessible by the second group but not the first group, and
the data comprise a first type which is dynamic and a second type which is static, in which, in a presence of the incompatibility
the first type is handled with one or more transformation functions and the shared dependent indexing structure, wherein the one or more transformation functions transform the first version of the data of the first type into the second version of the data of the first type, and
the second type is handled with at least the shared dependent indexing structure.

48. A system for managing data relating to an operation that causes an incompatibility for the data, the system comprising:
a processor configured for:
determining if the data is already implemented using a shared dependent indexing structure for a first group of one or more members to access a first version of the data and a second group of one or more members to access a second version of the data;
if the data is not already implemented using the shared dependent indexing structure, then implementing the data using at least the shared dependent indexing structure, wherein the act of implementing the data comprises:

generating a first dependent key for the first group, a second dependent key for the second group, and a dependent link, wherein the dependent link comprises a first private link, which links a shared normal key to the first dependent key, and a second private link, which links the shared normal key to the second dependent key; and performing the operation that causes the incompatibility between the first version and the second version of the data, wherein the shared dependent indexing structure allows the first version of the data to be accessible by the first group but not by the second group and allows the second version to be accessible by the second group but not by the first group and the data comprise a first type which is dynamic and a second type which is static, in which, in a presence of the incompatibility:

the first type is handled with one or more transformation functions and the shared dependent indexing structure, wherein the one or more transformation functions transform the first version of the data of the first type into the second version of the data of the first type, and the second type is handled with at least the shared dependent indexing structure.

49. A computer program product embodied on non-transitory computer readable medium, the non-transitory computer readable medium having stored thereon a sequence of instructions which, when executed by a processor, causes the processor to execute a process for managing data relating to an operation that causes an incompatibility for the data, the method comprising:

using a processor for:

identifying a first version of data;

identifying a second version of the data at a second location, wherein the second version is not compatible with the first version of the data;

creating a first dependent key for the first version, a second dependent key for the second version, and a dependent link, wherein the dependent link comprises a first private link, which links a shared normal key to the first dependent key, and a second private link, which links the shared normal key to the second dependent key;

associating one or more members of a first group and one or more members of a second group with the dependent link, wherein the one or more members of the first group are configured to be compatible with the first version of data, and the one or more members of the second group are configured to be compatible with the second version of the data, the dependent link allows the first version of the data to be accessible by the one or more members but not by the second group, and allows the second version to be accessible by the second group but not by the first group and the data comprises a first type which is dynamic and a second type which is static, in which, in a presence of the incompatibility:

the first type is handled with one or more transformation functions and the shared dependent indexing structure, wherein the one or more transformation functions transform the first version of the data of the first type into the second version of the data of the first type, and the second type is handled with at least the shared dependent indexing structure.

50. A system for managing data relating to an operation that causes an incompatibility for the data, the system comprising:

a processor configured for:

identifying a first version of data;

identifying a second version of the data at a second location, wherein the second version is not compatible with the first version of the data;

creating a first dependent key for the first version, a second dependent key for the second version, and a dependent link, wherein the dependent link comprises a first private link to link a shared normal key to the first dependent key, and a second private link to link the shared normal key to the second dependent key;

associating one or more members of a first group and one or more members of a second group with the dependent link, wherein the one or more members of the first group are configured to be compatible with the first version of data and the one or more members of the second group are configured to be compatible with the second version of the data, the dependent link allows the first version of the data to be accessible by the one or more members of the first group but not the second group and allows the second version of the data to be accessible by the second group but not by the first group, and the data comprises a first type which is dynamic and a second type which is static, in which, in a presence of the incompatibility:

the first type is handled with one or more transformation functions and the shared dependent indexing structure, wherein the one or more transformation functions transform the first version of the data of the first type into the second version of the data of the first type, and the second type is handled with at least the shared dependent indexing structure.

* * * * *

UNITED STATES PATENT AND TRADEMARK OFFICE
CERTIFICATE OF CORRECTION

| | | |
|---|---|---|
| PATENT NO. | : 7,921,419 B2 | Page 1 of 2 |
| APPLICATION NO. | : 10/844875 | |
| DATED | : April 5, 2011 | |
| INVENTOR(S) | : Chatterjee et al. | |

It is certified that error appears in the above-identified patent and that said Letters Patent is hereby corrected as shown below:

On page 2, in column 2, References Cited Under Other Publications, line 24, after "Non-Final" insert -- Office --.

In the specification

In column 7, line 53, after "functions are" delete "25".

In column 9, line 4, below "210 is modified." insert -- Similarly, when member 2 seeks to access data corresponding to key K, the value "20" will be returned back to member 2 and when member 3 seeks to access data corresponding to key K, the value "30" will be returned back to member 3. When member 2 seeks to modify the value of the data associated with key K, then the data at storage location for private data 212 is modified and member 3 seeks to modify the value of the data associated with key K, then the data at storage location for private data 214 is modified. --.

In column 9, line 5, after "corresponding" delete "10".

In column 9, line 29-53, below "212, respectively." delete "It is noted that while this example only shows a single member corresponding to each private data, the MDK may be configured such that multiple members access the same set of private data. This can be accomplished by using one or more group dependent keys (GDKs). In this approach, one or more groups are established to be associated with a GDK that is referenced by members 1, 2, and 3 using the key K. The GDK is configured to relate to multiple sets of storage locations for private data 210, 212, and 214 in which one or more members are associated with each group. Thus, private data 210 may be associated with a first group, private data 212 may be associated with a second group, and private data 214 may be associated with a third group. One or more default key values may also be maintained for members that are not associated with a group. Therefore, only members that are associated with the first group will access the private data at the location for private data 210. Any access to key K by the one or more members of the first group will retrieve or modify the value stored at the location for private data 210. Similarly, only members of the second and third groups will access the private data at the Signed and Sealed this
Thirteenth Day of October, 2015

Michelle K. Lee
*Director of the United States Patent and Trademark Office*

CERTIFICATE OF CORRECTION (continued)
U.S. Pat. No. 7,921,419 B2 location for private data 212 and 214, respectively. Any access to key K by the one or more members of the first group or the second group will retrieve or modify the value stored at the location for private data 212 or 214, respectively.".

In column 14, line 50, delete "unidirectional," and insert -- uni-directional, --, therefor.

In column 16, line 33, delete "binary_to ascii" and insert -- binary_to_ascii --, therefor.

In column 16, line 58, delete "csh. data," and insert -- csh.data, --, therefor.